(12) United States Patent
Kim et al.

(10) Patent No.: US 12,545,820 B2
(45) Date of Patent: Feb. 10, 2026

(54) DISPLAY DEVICE

(71) Applicant: Samsung Display Co., Ltd., Yongin-si (KR)

(72) Inventors: Young Do Kim, Yongin-si (KR); Seohyeon Choi, Yongin-si (KR); Muhyun Kim, Yongin-si (KR); Hansun Ryou, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 194 days.

(21) Appl. No.: 18/144,080

(22) Filed: May 5, 2023

(65) Prior Publication Data
US 2023/0383152 A1 Nov. 30, 2023

(30) Foreign Application Priority Data

May 30, 2022 (KR) .......................... 10-2022-0066218

(51) Int. Cl.
*C09J 151/00* (2006.01)
*G06F 1/16* (2006.01)
(Continued)

(52) U.S. Cl.
CPC ........ *C09J 151/003* (2013.01); *G06F 1/1652* (2013.01); *H04M 1/0268* (2013.01);
(Continued)

(58) Field of Classification Search
CPC .... G06F 1/1652; G06F 1/1616; G06F 1/1641; H04M 1/0268; H04M 1/0214;
(Continued)

(56) References Cited

U.S. PATENT DOCUMENTS

| 9,868,883 | B2 | 1/2018 | Kim et al. |
| 2014/0029212 | A1* | 1/2014 | Hwang .................. H05K 1/028 361/749 |

(Continued)

FOREIGN PATENT DOCUMENTS

| KR | 10-1550144 B1 | 12/2014 |
| KR | 10-2021-0047602 A | 4/2021 |

OTHER PUBLICATIONS

[NPL-1] Shen, L.; Cheng, J.; Zhang, J.; "Reworkable adhesives: Healable and fast response at ambient environment based on anthracene-based thiol-ene networks"; European Polymer Journal, 137 (2020) 109927, 8 pages. (Year: 2020).*

(Continued)

*Primary Examiner* — Donald M Flores, Jr.
(74) *Attorney, Agent, or Firm* — Womble Bond Dickinson (US) LLP

(57) ABSTRACT

A display device of an embodiment includes a display module, a window disposed on the upper side of the display module, a protective layer disposed on the upper side of the window, a housing disposed on the lower side of the display module, and a protective layer adhesive layer disposed between the window and the protective layer, wherein the protective layer adhesive layer includes a polymer compound including multiple polymer main chains and multiple crosslinking parts, the crosslinking parts form multiple crosslinking bonds between the polymer main chains through Diels-Alder reaction, and the crosslinking bonds are separated through Retro-Diels-Alder reaction, thereby showing easy reworkability and excellent or suitable mechanical properties.

25 Claims, 12 Drawing Sheets

Prior to Curing

After Curing

(51) Int. Cl.
H04M 1/02 (2006.01)
H05K 5/03 (2006.01)
(52) U.S. Cl.
CPC .............. *H05K 5/03* (2013.01); *Y10T 428/23* (2015.01); *Y10T 428/24942* (2015.01)
(58) Field of Classification Search
CPC . H05K 5/03; Y10T 428/23; Y10T 428/24942; G09F 9/301; H10K 50/841; H10K 77/111; H10K 2102/311
See application file for complete search history.

(56) References Cited

U.S. PATENT DOCUMENTS

| | | | |
|---|---|---|---|
| 2016/0066440 A1* | 3/2016 | Choi | G06F 1/1601 361/679.3 |
| 2020/0022267 A1* | 1/2020 | Han | H10K 50/8426 |
| 2021/0072791 A1* | 3/2021 | Yu | G06F 1/1616 |

OTHER PUBLICATIONS

[NPL-2] Wouters, M.; Burghoorn, M.; Ingenhut, B.; Timmer, K.; Rentrop, C.; Bots, T.; Oosterhuis, G.; Fischer, H.; "Tuneable adhesion through novel binder technologies"; Progress in Organic Coatings, 72 (2011); pp. 152-158. (Year: 2011).*

[NPL-3] Harper, T.; Slegeris, R.; Pramudya, I.; Chung, H.; "Single-Phase Photo-Cross-Linkable Bioinspired Adhesive for Precise Control of Adhesion Strength"; ACS Appl. Mater. Interfaces, 9 (2017), pp. 1830-1839. (Year: 2017).*

S. Kaiser, et al., Switching "on" and "off" the adhesion in stimuli-responsive elastomers, Soft Matter Accepted Manuscript, 2018, pp. 1-15, vol. 00, No. 1-3, The Royal Society of Chemistry.

Lijiao Shen et al., Reworkable adhesives: Healable and fast response at ambient environment based on anthracene-based thiol-ene networks, European Polymer Journal, 2020, pp. 1-9, vol. 137, No. 109927, Elsevier Ltd.

* cited by examiner

DISPLAY DEVICE

CROSS-REFERENCE TO RELATED APPLICATION

This application claims priority to and the benefit of Korean Patent Application No. 10-2022-0066218, filed on May 30, 2022, in the Korean Intellectual Property Office, the entire content of which is hereby incorporated by reference.

BACKGROUND

1. Field

The present disclosure herein relates to a display device, and for example, a display device including an adhesive layer, of which the adhesive strength is controlled by ultraviolet rays.

2. Description of the Related Art

Various display devices utilized in multimedia devices such as televisions, cellular phones, tablet computers, navigations and/or game consoles are being developed. In addition, recently, to improve the user convenience, the development on foldable or rollable display devices by including a flexible display member is being conducted.

To protect the display surface of such a display device, a protective layer is applied, and when the outermost protective layer is damaged, easy reworking is desired or required. Also, in foldable or rollable display devices, the reduction of the stress of the adhesive layer, which corresponds to a folding region, is desired or required to improve folding properties.

SUMMARY

An aspect according to one or more embodiments of the present disclosure is directed toward a display device including an adhesive layer having excellent or suitable reworkability.

An aspect according to one or more embodiments of the present disclosure is directed toward a display device including an adhesive layer having reduced adhesive strength in a selected area.

Additional aspects will be set forth in part in the description, which follows and, in part, will be apparent from the description, or may be learned by practice of the presented embodiments of the disclosure.

According to an embodiment of the present disclosure, a display device includes: a display module; a window above the display module; a protective layer above the window; a housing under the display module; and a protective layer adhesive layer between the window and the protective layer, wherein the protective layer adhesive layer includes a polymer compound including multiple polymer main chains and multiple crosslinking parts, the multiple crosslinking parts form multiple crosslinking bonds between the multiple polymer main chains through Diels-Alder reaction, and the multiple crosslinking bonds are to be separated through Retro-Diels-Alder reaction.

In an embodiment, the crosslinking bonds may be formed by exposing the multiple crosslinking parts to first ultraviolet rays with a wavelength of greater than about 280 nm, and the multiple crosslinking bonds may be separated by exposing the multiple crosslinking bonds to second ultraviolet rays with about 280 nm or less.

In an embodiment, the display device may further include a housing adhesive layer between the display module and the housing, and the housing adhesive layer may include the polymer compound.

In an embodiment, a first adhesive strength of the protective layer adhesive layer with a glass substrate as an adherent in a state after being exposed to the second ultraviolet rays, may be about 10% or less of a second adhesive strength of the protective layer adhesive layer with a glass substrate as an adherent in a state after being exposed to only the first ultraviolet rays.

In an embodiment, adjacent two crosslinking parts from among the multiple crosslinking parts may be combined with each other by exposing to first ultraviolet rays with a wavelength of greater than about 280 nm to form a photodimer, and the photodimer may undergo photolysis by exposing to second ultraviolet rays with a wavelength of about 280 nm or less.

In an embodiment, each of the crosslinking parts may include an anthracene derivative represented by Formula 1.

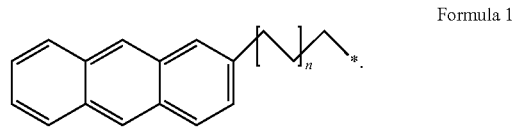

Formula 1

In Formula 1, "n" is an integer of 1 to 20, and -* is a part bonded to the polymer main chain.

In an embodiment, the photodimer may include a structure represented by Formula 2.

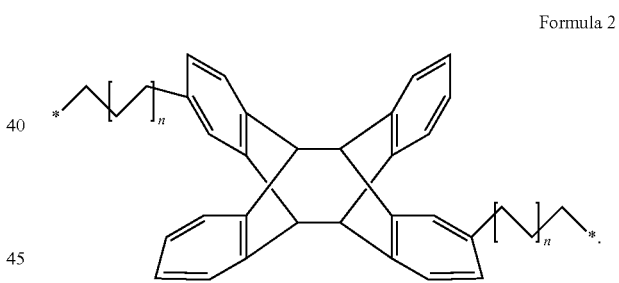

Formula 2

In Formula 2, "n" is the same as defined in Formula 1, and -* is a part bonded to the polymer main chain.

In an embodiment, the polymer main chain may be formed by a polymerization reaction of at least one monomer from among a 4-hydroxybutyl acrylate monomer, a butyl acrylate monomer, and a methyl methacrylate monomer.

In an embodiment, the display device may include a folding area and a non-folding area adjacent to the folding area, and further include a support plate between the display module and the housing, the support plate including a folding support corresponding to the folding area and a non-folding support corresponding to the non-folding area.

In an embodiment, the display device may further include a housing adhesive layer including a non-folding adhesive part corresponding to the non-folding area and having a first adhesive strength, and a folding adhesive part corresponding to the folding area and having a second adhesive strength smaller than the first adhesive strength, the housing adhesive layer includes the polymer compound, and a number of the crosslinking bonds in the non-folding adhesive part may be greater than a number of the crosslinking bonds in the folding adhesive part.

In an embodiment, the display device may further include at least one upper adhesive layer above the support plate, and at least one lower adhesive layer under the support plate, and wherein at least one from among the at least one upper adhesive layer and the at least one lower adhesive layer may include the polymer compound.

In an embodiment, the at least one upper adhesive layer may include a first adhesive part corresponding to the non-folding area and having a first adhesive strength, and a second adhesive part corresponding to the folding area and having a second adhesive strength greater than the first adhesive strength, the at least one upper adhesive layer includes the polymer compound, and a number of the crosslinking bonds in the first adhesive part may be greater than a number of the crosslinking bonds in the second adhesive part.

In an embodiment, the second adhesive strength may be about 10% or less of the first adhesive strength.

In an embodiment, the at least one lower adhesive layer may include a first adhesive part corresponding to the non-folding area and having a first adhesive strength, and a second adhesive part corresponding to the folding area and having a second adhesive strength that is smaller than the first adhesive strength, the at least one lower adhesive layer includes the polymer compound, and a number of the crosslinking bonds in the first adhesive part may be greater than a number of the crosslinking bonds in the second adhesive part.

In an embodiment, the second adhesive strength may be about 10% or less of the first adhesive strength.

In an embodiment, the protective layer may include at least one polymer resin from among polyethylene terephthalate, polybutylene terephthalate, polyethylene naphthalene, polycarbonate, polymethyl methacrylate, polystyrene, polyvinyl chloride, polyethersulfone, polypropylene, polyamide, polyphenylene ether, polyoxymethylene, polysulfone, polyphenylene sulfide, polyimide, polyethyleneimine, polyether ether ketone, polyamide imide, polyarylate and thermoplastic polyurethane.

Another embodiment of the present disclosure provides a display device including a folding area foldable relative to a folding axis extended in a first direction, and a non-folding area adjacent to the folding area, and including: a display module; an upper module above the display module and including a window, a protective layer on the window, and a protective layer adhesive layer between the window and the protective layer; and a lower module under the display module and including a support plate, an upper adhesive layer above the support plate, and a lower adhesive layer under the support plate, wherein at least one from among the protective layer adhesive layer, the upper adhesive layer and the lower adhesive layer includes a polymer compound including multiple polymer main chains and multiple crosslinking parts, the multiple crosslinking parts form multiple crosslinking bonds between the multiple polymer main chains through Diels-Alder reaction, and the multiple crosslinking bonds are to be separated by Retro-Diels-Alder reaction.

In an embodiment, the multiple crosslinking bonds may be formed by exposing the multiple crosslinking parts to first ultraviolet rays with a wavelength of greater than about 280 nm, and the multiple crosslinking bonds may be separated by exposing the multiple crosslinking bonds to second ultraviolet rays with a wavelength of about 280 nm or less.

In an embodiment, at least one from among the upper adhesive layer and the lower adhesive layer may include the polymer compound and a first adhesive part corresponding to the non-folding area and having a first adhesive strength and a second adhesive part corresponding to the folding area and having a second adhesive strength smaller than the first adhesive strength, a the number of the crosslinking bonds in the first adhesive part may be greater than a number of the crosslinking bonds in the second adhesive part.

In an embodiment, the second adhesive strength may be about 10% or less of the first adhesive strength.

Another embodiment of the present disclosure provides a display device include a folding area foldable relative to a folding axis extended in a first direction, and a non-folding area adjacent to the folding area, and including: a display module; an upper module above the display module and including a window, a protective layer on the window, and a protective layer adhesive layer between the window and the protective layer; and a lower module under the display module and including a support plate, an upper adhesive layer above the support plate, and a lower adhesive layer under the support plate, wherein at least one from among the protective layer adhesive layer, the upper adhesive layer and the lower adhesive layer includes a polymer compound including multiple polymer main chains and multiple crosslinking parts, adjacent two crosslinking parts from among the multiple crosslinking parts are combined with each other by exposing to first ultraviolet rays with a wavelength of greater than about 280 nm to form a photodimer, and the photodimer is to undergo photolysis by second ultraviolet rays with a wavelength of about 280 nm or less.

In an embodiment, each of the crosslinking parts may include an anthracene derivative represented by Formula 1.

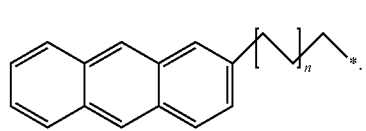

Formula 1

In Formula 1, "n" is an integer of 1 to 20, and -* is a part bonded to the polymer main chain.

In an embodiment, the photodimer may include a structure represented by Formula 2.

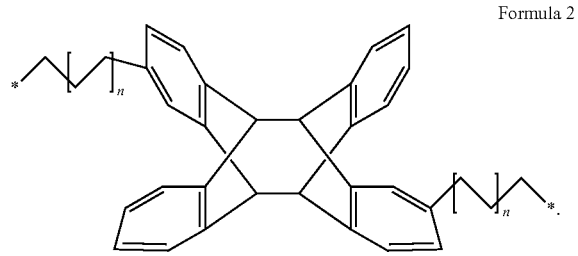

Formula 2

In Formula 2, "n" is the same as defined in Formula 1, and -* is a part bonded to the polymer main chain.

In an embodiment, the polymer main chain may be formed by a polymerization reaction of at least one monomer from among a 4-hydroxybutyl acrylate monomer, a butyl acrylate monomer, and a methyl methacrylate monomer.

In an embodiment, at least one from among the upper adhesive layer and the lower adhesive layer may include the polymer compound and a first adhesive part corresponding to the non-folding area and having a first adhesive strength, and a second adhesive part corresponding to the folding area and having a second adhesive strength smaller than the first adhesive strength, and a number of the crosslinking bonds in the first adhesive part may be greater than a number of the crosslinking bonds in the second adhesive part.

In an embodiment, the second adhesive strength may be about 10% or less of the first adhesive strength.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and, together with the description, serve to explain principles of the present disclosure. In the drawings.

DETAILED DESCRIPTION

Figure 1:
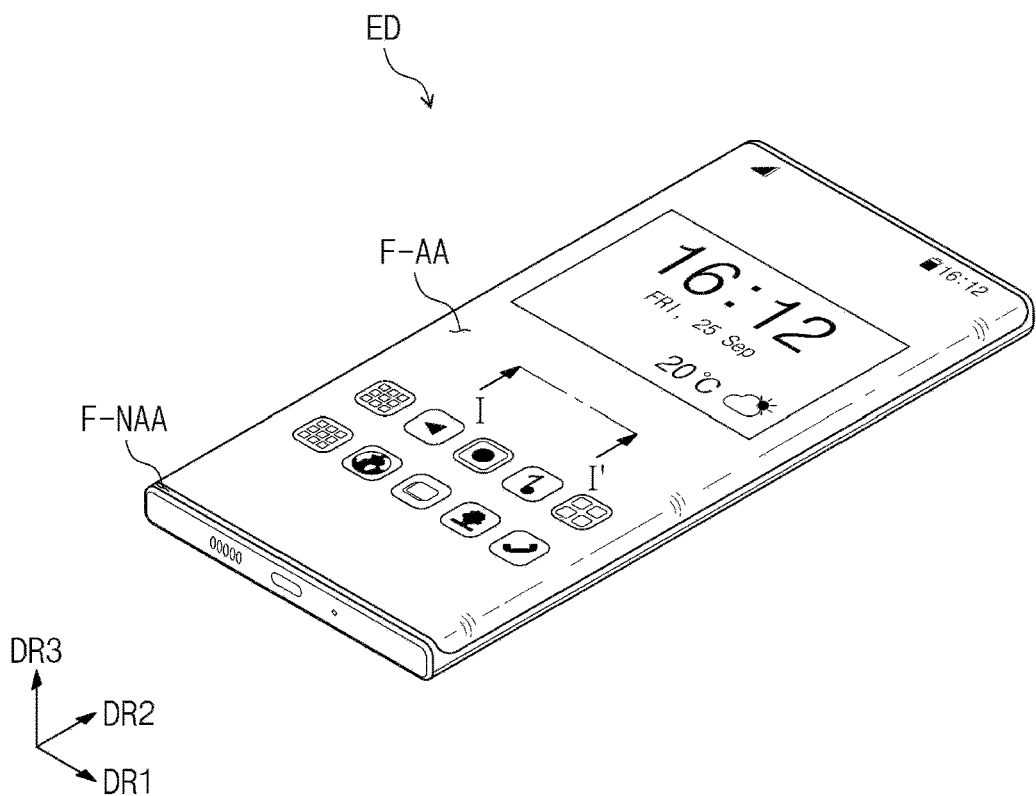
FIG. 1 is a perspective view of a display device according to an embodiment.

The present disclosure may have one or more suitable modifications and may be embodied in different forms, and example embodiments will be explained in more detail with reference to the accompany drawings. The present disclosure may, however, be embodied in different forms and should not be construed as limited to the embodiments set forth herein. Rather, all modifications, equivalents, and substituents which are included in the spirit and technical scope of the present disclosure should be included in the present disclosure.

In the description, when an element (or a region, a layer, a part, etc.) is referred to as being "on", "connected with" or "combined with" another element, it can be directly on, connected with, or bonded on the other element, or intervening third elements may also be disposed.

Meanwhile, in the description, the term "directly disposed" may refer to that between two layers, films, regions, plates, etc., no additional layers, films, regions, planes etc., are present. For example, "directly disposed" may refer to that two layers or two members are disposed without using an additional member such as an adhesive member between the two members.

Like reference numerals refer to like elements throughout, and duplicative descriptions thereof may not be provided. In the drawings, the thicknesses, ratios, and dimensions of elements may be exaggerated for effective explanation of technical contents. "and/or" may include one or more combinations that may define relevant elements.

It will be understood that, although the terms first, second, etc. may be used herein to describe various elements, these elements should not be limited by these terms. These terms are only used to distinguish one element from another element. For example, a first element could be termed a second element without departing from the scope of the present disclosure. Similarly, a second element could be termed a first element. As used herein, the singular forms are intended to include the plural forms as well, unless the context clearly indicates otherwise.

In addition, the terms "below", "beneath", "on" and "above" are used for explaining the relationship of elements shown in the drawings. These terms are relative concept and are explained based on the direction shown in the drawings. In the description, "disposed on" may also represent disposed under as well as disposed on a member.

It will be further understood that the terms "comprises" and/or "comprising," when used in this specification, specify the presence of stated features, numerals, steps, operations, elements, parts, or the combination thereof, but do not preclude the presence or addition of one or more other features, numerals, steps, operations, elements, parts, or the combination thereof.

Unless otherwise defined, all terms (including technical and scientific terms) used herein have the same meaning as commonly understood by one of ordinary skill in the art to which this present disclosure belongs. In addition, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the display device according to an embodiment of the present disclosure will be explained in more detail by referring to the drawings.

Figure 2:
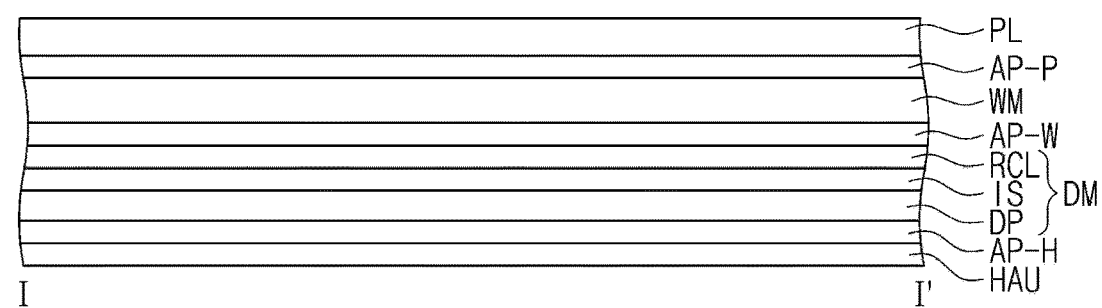
FIG. 2 is a cross-sectional view of a display device according to an embodiment.

FIG. 1 is a perspective view showing a display device according to an embodiment. FIG. 2 is a cross-sectional view of a display device according to an embodiment. FIG. 2 is a cross-sectional view of a part corresponding to the line I-I' of FIG. 1.

Referring to FIG. 1 and FIG. 2, the display device ED of an embodiment may be a device to be activated according to electrical signals. For example, the display device ED may be a cellular phone, a tablet, a car navigation, a game console, or a wearable device, but an embodiment of the present disclosure is not limited thereto. In FIG. 1, the display device ED is shown as a cellular phone as an example.

The display device ED of an embodiment may include a display module DM, a window WM disposed on the upper side of the display module DM, a protective layer PL disposed on the upper side of the window WM, a protective layer adhesive layer AP-P disposed on the lower side of the protective layer PL, and a housing HAU disposed on the lower side of the display module DM. In some embodiments, the display device ED of an embodiment may further include a housing adhesive layer AP-H disposed between the display module DM and the housing HAU.

The display device ED according to an embodiment may display images through an active area F-AA. The active area F-AA may include a plane defined by a first direction axis DR1 and a second direction axis DR2. The active area F-AA may further include a bent curve (e.g., a curved surface extending) from at least one side of the plane defined by the first direction axis DR1 and the second direction axis DR2. The display device ED of an embodiment, shown in FIG. 1, is shown to include two bent curves from both sides of the plane (e.g., two curved surfaces extending from two sides of the plane surface) defined by the first direction axis DR1 and the second direction axis DR2. However, the shape of the active area F-AA is not limited thereto. For example, the active area F-AA may include only the plane, or the active area F-AA may further include at least two or more, for example, four curves (e.g., curved surfaces) bent from four sides of the plane.

A surrounding area F-NAA is adjacent to the active area F-AA. The surrounding area F-NAA may be around (e.g., surround) the active area F-AA. However, this is only an illustration, and the surrounding area F-NAA may be disposed adjacent to only one side of the active area F-AA, or may not be provided. The display device ED according to an embodiment of the present disclosure may include active areas with one or more suitable shapes, and an embodiment of the present disclosure is not limited thereto.

In FIG. 1, a first direction axis DR1 to a third direction axis DR3 are shown, and the directions indicated by the first to third direction axes DR1, DR2 and DR3 explained in the description are relative concept and may be transformed into other directions. In some embodiments, the directions indicated by the first to third direction axes DR1, DR2 and DR3 may be explained as first to third directions, and the same reference symbols may be utilized. In the description, the first direction axis DR1 and the second direction axis DR2 may be orthogonal to each other, and the third direction axis DR3 may be a normal line direction with respect to a plane defined by the first direction axis DR1 and the second direction axis DR2.

The thickness direction of the display device ED may be a direction parallel to the third direction axis DR3 that is a normal line direction with respect to the plane defined by the first direction axis DR1 and the second direction axis DR2. In the present description, the front surface (or top surface or upper side or above) and rear surface (or bottom surface or lower side or under) of the members constituting the display device ED may be defined based on the third direction axis DR3.

The display module DM included in the display device ED of an embodiment may have a configuration suitable for displaying images and sensing an input applied from the outside. The display module DM according to an embodiment may include a display panel DP and an input sensor IS disposed on the display panel DP. In some embodiments, the display module DM of an embodiment may further include an optical layer RCL disposed on the input sensor IS.

The display panel DP may have a configuration suitable for substantially producing images. The display panel DP may be an emission-type or kind display panel, and for example, the display panel DP may be an organic light emitting display panel, an inorganic light emitting display panel, a quantum dot display panel, a micro LED display panel, or a nano LED display panel. The display panel DP may be referred to as a display layer.

The input sensor IS may be disposed on the display panel DP. The input sensor IS may sense an external input applied from the outside. The external input may be input of a user. The input of a user may include one or more suitable types (kinds) of inputs from the outside including a part of the user's body, light, heat, a pen, and/or a pressure.

The input sensor IS may be formed on the display panel DP through a substantially continuous process. In this case, the input sensor IS may be described as disposed directly on the display panel DP. The direct disposition may refer to that a third configuration member is not disposed between the input sensor IS and the display panel DP. For example, between the input sensor IS and the display panel DP, a separate adhesive member may not be disposed. In some embodiments, the input sensor IS may be combined with the display panel DP through an adhesive member. The adhesive member may include a suitable common adhesive or a suitable sticking agent.

The optical layer RCL may be disposed on the input sensor IS. The optical layer RCL may be an anti-reflection layer for reducing the reflectivity by external light incident from the exterior of the display module DM. The optical layer RCL may be formed on the input sensor IS through substantially continuous processes. The optical layer RCL may include a polarization plate and/or a color filter layer. In some embodiments, the optical layer RCL may include a dye and/or a pigment to absorb light in a specific wavelength region. When the optical layer RCL includes a color filter layer, the color filter layer may include multiple color filters disposed in a certain arrangement. For example, the multiple color filters may be arranged considering the emission colors of pixels included in the display panel DP. In some embodiments, the optical layer RCL may further include a partition pattern dividing the pixels of the display panel DP, etc. The partition pattern may include a black pigment and/or dye. In an embodiment of the present disclosure, the optical layer RCL may not be provided.

The display device ED may include a window WM disposed on the display module DM. The window WM may cover the whole exterior of the display module DM. The window WM may have a shape corresponding to the display module DM. In the display device ED of an embodiment, the window WM may include an optically clear insulating material. The window WM may be a glass substrate or a polymer substrate. For example, the window WM may be a tempered glass substrate that has undergone strengthening treatment.

The display device ED of an embodiment may further include a window adhesive layer AP-W. The window adhesive layer AP-W may be disposed between the display module DM and the window WM. The window adhesive layer AP-W may be an optically clear adhesive film (OCA), or an optically clear adhesive resin layer (OCR). In an embodiment, the window adhesive layer AP-W may not be provided.

In an embodiment, the protective layer PL may be disposed on the upper side of the window WM to protect the window WM from external environments. The protective layer PL is clear, and though the protective layer PL is included, image information provided from the display module DM may be secured (e.g., may be clearly visible to a viewer). The protective layer PL may be exposed to (e.g., may be) the uppermost surface of the display device ED, and according to the utilization of the display device ED, the protective layer PL may be damaged (e.g., while protecting the window WM).

The protective layer PL may have a transmittance of about 90% or more in a visible region, and may have optical properties having a haze value of less than about 1%. The protective layer PL may include a polymer film. In some embodiments, the protective layer PL may include the polymer film as a base layer, and may further include a functional layer such as a hard coating layer, a fingerprint preventive coating layer, and/or an antistatic coating layer. In some embodiments, the protective layer PL utilized in the display device ED of an embodiment may have flexibility.

The protective layer PL according to an embodiment may be a polymer film including at least one polymer resin from among polyethylene terephthalate (PET), poly(butylene terephthalate) (PBT), polyethylene naphthalene (PEN), polycarbonate (PC), poly(methyl methacrylate) (PMMA), polystyrene (PS), polyvinyl chloride (PVC), polyether sulfone (PES), polypropylene (PP), polyamide (PA), modified polyphenylene ether (m-PPO), polyoxymethylene (POM), polysulfone (PSU), polyphenylene sulfide (PPS), polyimide (PI), polyethyleneimine (PEI), polyether ether ketone (PEEK), polyamide imide (PAI), polyarylate (PAR) and thermoplastic polyurethane (TPU).

For example, the protective layer PL of an embodiment may be a polyethylene terephthalate (PET) film or a thermoplastic polyurethane (TPU) film. In some embodiments, the protective layer PL may be a PET film without phase delay.

In the display device ED of an embodiment, a protective layer adhesive layer AP-P may be disposed between the window WM and the protective layer PL. The protective layer adhesive layer AP-P may be an optically clear adhesive layer.

The protective layer adhesive layer AP-P may be attached to the window WM and immobilize (e.g., secure) the protective layer PL to the window WM. The protective layer adhesive layer AP-P according to an embodiment may include a polymer compound including a polymer main chain and multiple crosslinking parts. In an embodiment, the protective layer adhesive layer AP-P may have reduced adhesive strength when ultraviolet rays with a wavelength of about 280 nm or less is provided. That is, by exposing to ultraviolet rays with a wavelength of about 280 nm or less, the adhesive strength of the protective layer adhesive layer AP-P may be reduced. Accordingly, by reducing the adhesive strength of the protective layer adhesive layer AP-P utilizing ultraviolet rays, the protective layer PL may be easily removed from the display device ED according to the user's intention. Accordingly, the display device ED of an embodiment includes the protective layer adhesive layer AP-P of which adhesive strength is reduced with the provision of (e.g., by exposing to) ultraviolet rays with a wavelength of about 280 nm or less, and may show improved effects of reworkability.

In an embodiment, the housing HAU may contain the display module DM, etc. In an embodiment, a housing adhesive layer AP-H may be disposed under the display module DM. The housing adhesive layer AP-H may immobilize (e.g., secure) the display module DM to the housing HAU. The housing adhesive layer AP-H according to an embodiment may include a polymer compound including a polymer main chain and multiple crosslinking parts. In an embodiment, the housing adhesive layer AP-H may have reduced adhesive strength with the provision of ultraviolet rays with a wavelength of about 280 nm or less. That is, by exposing to ultraviolet rays with a wavelength of about 280 nm or less, the adhesive strength of the housing adhesive layer AP-H may be reduced. Accordingly, by reducing the adhesive strength of the housing adhesive layer AP-H utilizing ultraviolet rays, the display module DM and the housing HAU may be easily separated. Accordingly, the display device ED of an embodiment may include a housing adhesive layer AP-H of which adhesive strength is reduced with the provision of (e.g., by exposing to) ultraviolet rays with a wavelength of about 280 nm or less to show improving effects of reworkability.

The protective layer adhesive layer AP-P and the housing adhesive layer AP-H, included in the display device ED of an embodiment will be explained in more detail.

Hereinafter, referring to FIG. 3A to FIG. 5, etc., the display device according to an embodiment will be explained in more detail. The display device ED-a according to an embodiment, explained by referring to FIG. 3A to FIG. 5 is different from the display device ED explained by referring to FIG. 1 and FIG. 2 in that a folding operation is possible. Hereinafter, in the explanation on an embodiment by referring to FIG. 3A to FIG. 5, etc., the overlapping contents as the embodiment shown in FIG. 1 and FIG. 2 will not be explained again, and the explanation will be mainly focused on different features.

Figure 3A:
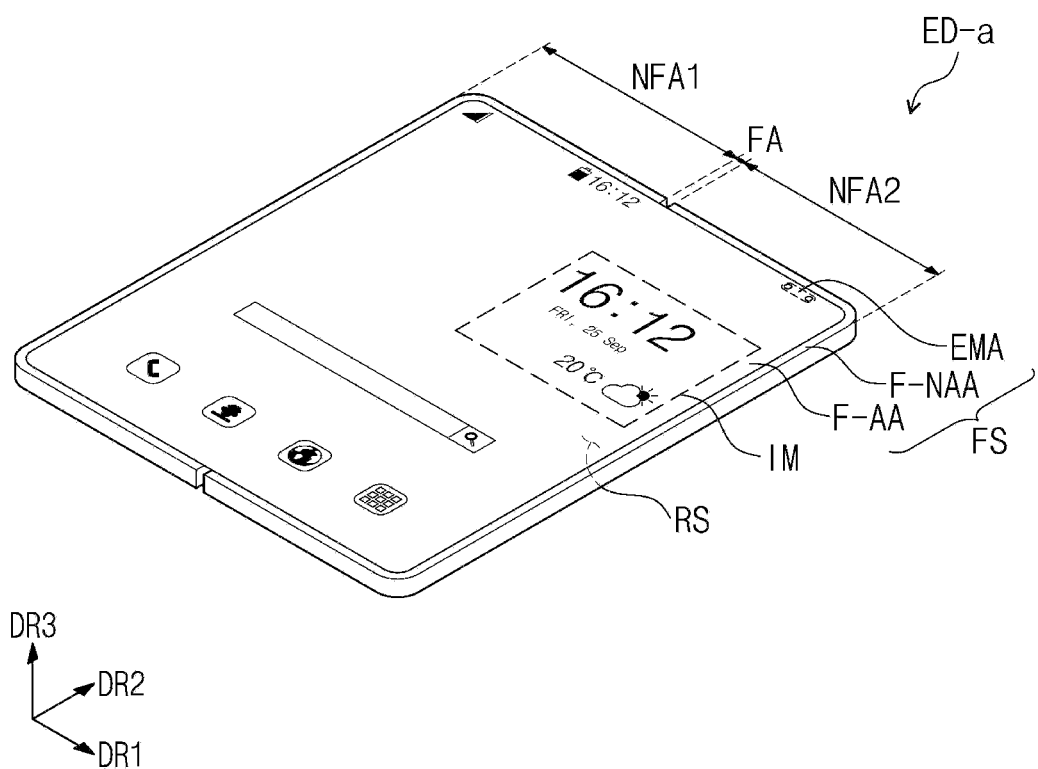
FIG. 3A is a perspective view showing an unfolded state of a display device according to an embodiment.
Figure 3B:
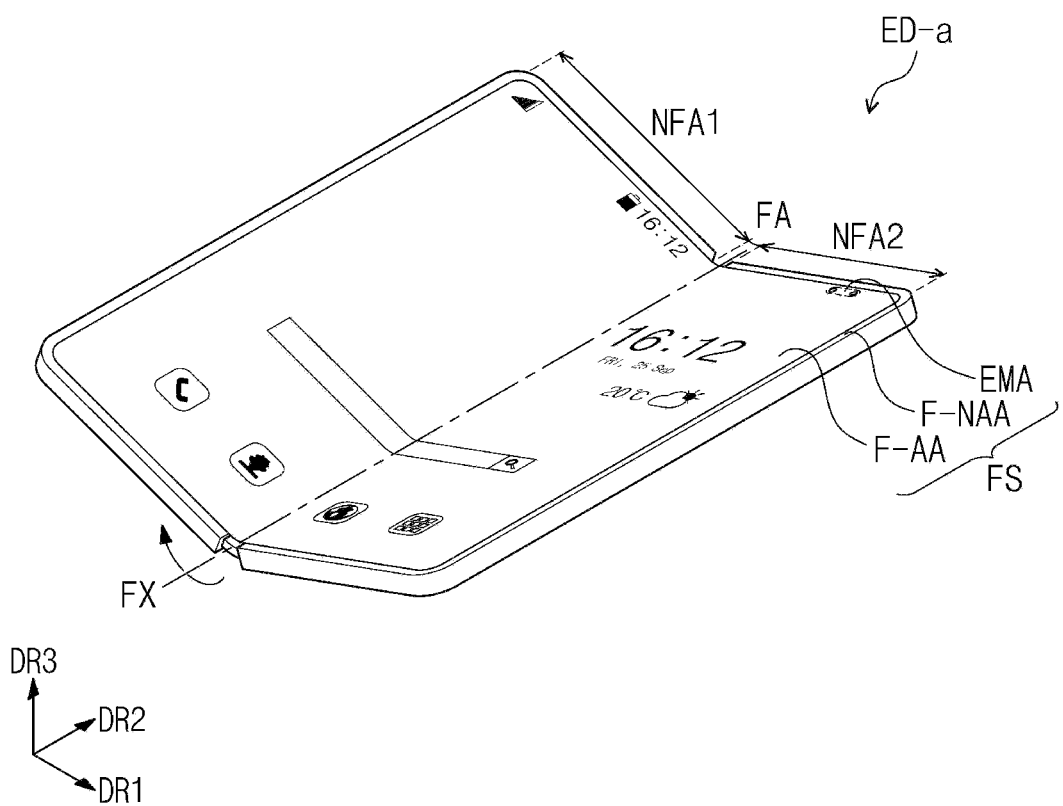
FIG. 3B is a perspective view showing an inner-folding process of a display device according to an embodiment.
Figure 3C:
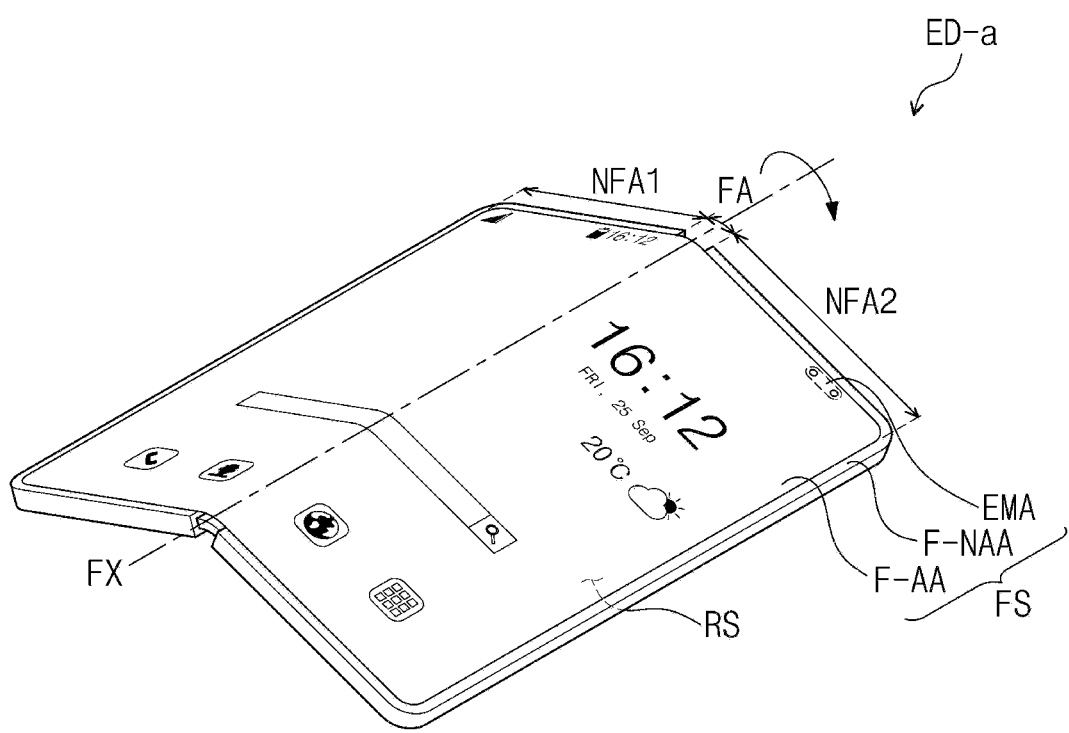
FIG. 3C is a perspective view showing an outer-folding process of a display device according to an embodiment.
Figure 3C:
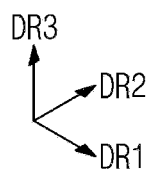

FIG. 3A is a perspective view of a display device in an unfold state according to an embodiment. FIG. 3B is a perspective view showing an inner-folding process of the display device shown in FIG. 3A. FIG. 3C is a perspective view showing an outer-folding process of the display device shown in FIG. 3A.

In FIG. 3A to FIG. 3C, a display device ED-a is shown as a foldable display device that is transformed into a folding (e.g., folded) shape, but an embodiment of the present disclosure is not limited thereto, and the display device ED-a of an embodiment may be a flexible display device which may be bent or rolled to transform its shape.

Referring to FIG. 3A to FIG. 3C, the display device ED-a of an embodiment may include a display surface FS defined by a first direction axis DR1 and a second direction axis DR2 crossing the first direction axis DR1. The display device ED-a may provide a user images IM through the display surface FS. The display device ED-a of an embodiment may display images IM toward a third direction axis DR3 on the display surface FS that is parallel to each of the first direction axis DR1 and the second direction axis DR2.

The display surface FS of the display device ED-a according to an embodiment may include an active area F-AA and a surrounding area F-NAA. The active area F-AA may be an area activated by electrical signals. The display device ED-a according to an embodiment may display images IM through the active area F-AA. In some embodiments, one or more suitable types (kinds) of external inputs may be sensed in the active area F-AA. The surrounding area F-NAA is adjacent to the active area F-AA. The surrounding area F-NAA may have a certain color. The surrounding area F-NAA may be around (e.g., surround) the active area F-AA. Accordingly, the shape of the active area F-AA may be substantially defined by the surrounding area F-NAA. However, this is an example, and the surrounding area F-NAA may be disposed adjacent to only one side of the active area F-AA or may not be provided. The display device ED-a according to an embodiment of the present disclosure may include one or more suitable shapes of active areas, and the present disclosure is not limited to any one embodiment.

The active area F-AA may include a sensing area EMA. In the sensing area EMA, one or more suitable electronic modules may be disposed. For example, the electronic module may include at least one from among a camera module, a speaker, a light sensor, and a heat sensor. The sensing area EMA may sense an external subject received through the display surface FS and/or provide sound signals such as voice to the outside through the display surface FS. The electronic module may include multiple configurations, and the present disclosure is not limited to any one embodiment.

The sensing area EMA may be surrounded by the active area F-AA and the surrounding area F-NAA. However, the present disclosure is not limited thereto, and in an embodiment, the sensing area EMA may be disposed in the active area F-AA. In FIG. 3A, etc., one sensing area EMA is shown as an example, but the number of the sensing areas EMA is not limited thereto.

The sensing area EMA may be a part of the active area F-AA. Accordingly, the display device ED-a may also display images in the sensing area EMA. When the electronic modules disposed in the sensing area EMA are deactivated, the sensing area EMA may display videos or images as a display surface.

The rear surface RS of the display device ED-a of an embodiment may be a surface facing away from the display surface FS. In an embodiment, the rear surface RS may not display videos or images to the outer surface of the display device ED-a. However, an embodiment of the present disclosure is not limited thereto, and the rear surface RS may play the role of a second display surface for displaying videos and images. In some embodiments, the display device ED-a of an embodiment may further include a sensing area disposed in the rear surface RS. In the sensing area disposed in the rear surface RS, a camera, a speaker, a light sensing sensor, etc., may also be disposed.

The display device ED-a may include a folding area FA and non-folding areas NFA1 and NFA2. The display device ED-a may include multiple non-folding areas NFA1 and NFA2. The display device ED-a of an embodiment may include a first non-folding area NFA1 and a second non-folding area NFA2, disposed with the folding area FA therebetween. In some embodiments, in FIG. 3A to FIG. 3C, an embodiment of a display device ED-a including one folding area FA is shown, but an embodiment of the present disclosure is not limited thereto, and multiple folding areas may be defined in the display device ED-a. However, an embodiment of the present disclosure is not limited thereto. The display device ED-a of an embodiment may be folded relative to (e.g., along) multiple folding axes so that portions of the display surface FS may face each other. The number of the folding axes and thus, the number of the non-folding areas are not specifically limited.

Referring to FIG. 3B and FIG. 3C, the display device ED-a according to an embodiment may be folded relative to (e.g., along) a folding axis FX extended in one direction. The folding axis FX shown in FIG. 3B and FIG. 3C is an imaginary axis extended in a second direction axis DR2 and may be parallel to the long side direction of the display device ED-a. However, an embodiment of the present disclosure is not limited thereto, and the extending direction of the folding axis FX is not limited to the second direction axis DR2.

The folding axis FX may be extended along the second direction axis DR2 on the display surface FS or may be extended along the second direction axis DR2 under the rear surface RS. Referring to FIG. 3B, in an embodiment, the first non-folding area NFA1 and the second non-folding area NFA2 are brought to face each other, and the display device ED-a may be inner-folded so that the display surface FS is unexposed to the outside. In some embodiments, referring to FIG. 3C, the display device ED-a according to an embodiment may be folded relative to (e.g., along) the folding axis FX and may be transformed into an outer-folding state so that one area overlapping the first non-folding area NFA1 and another area overlapping the second non-folding area NFA2 in the rear surface RS may be brought to face each other.

In an embodiment, the display device ED-a may be constituted (e.g., configured) to repeat from an unfolding operation to an inner-folding or outer-folding operation, but an embodiment of the present disclosure is not limited thereto. In an embodiment, the display device ED-a may be constituted (e.g., configured) to carry out any one or more operations select from among an unfolding operation, an inner-folding operation, and an outer-folding operation.

In some embodiments, FIG. 3A to FIG. 3C show a folding operation relative to the folding axis FX that is parallel to the long side of the display device ED-a, but an embodiment of the present disclosure is not limited thereto. The display device of an embodiment may be folded relative to a folding axis that is parallel to the short side of the display device.

Figure 4:
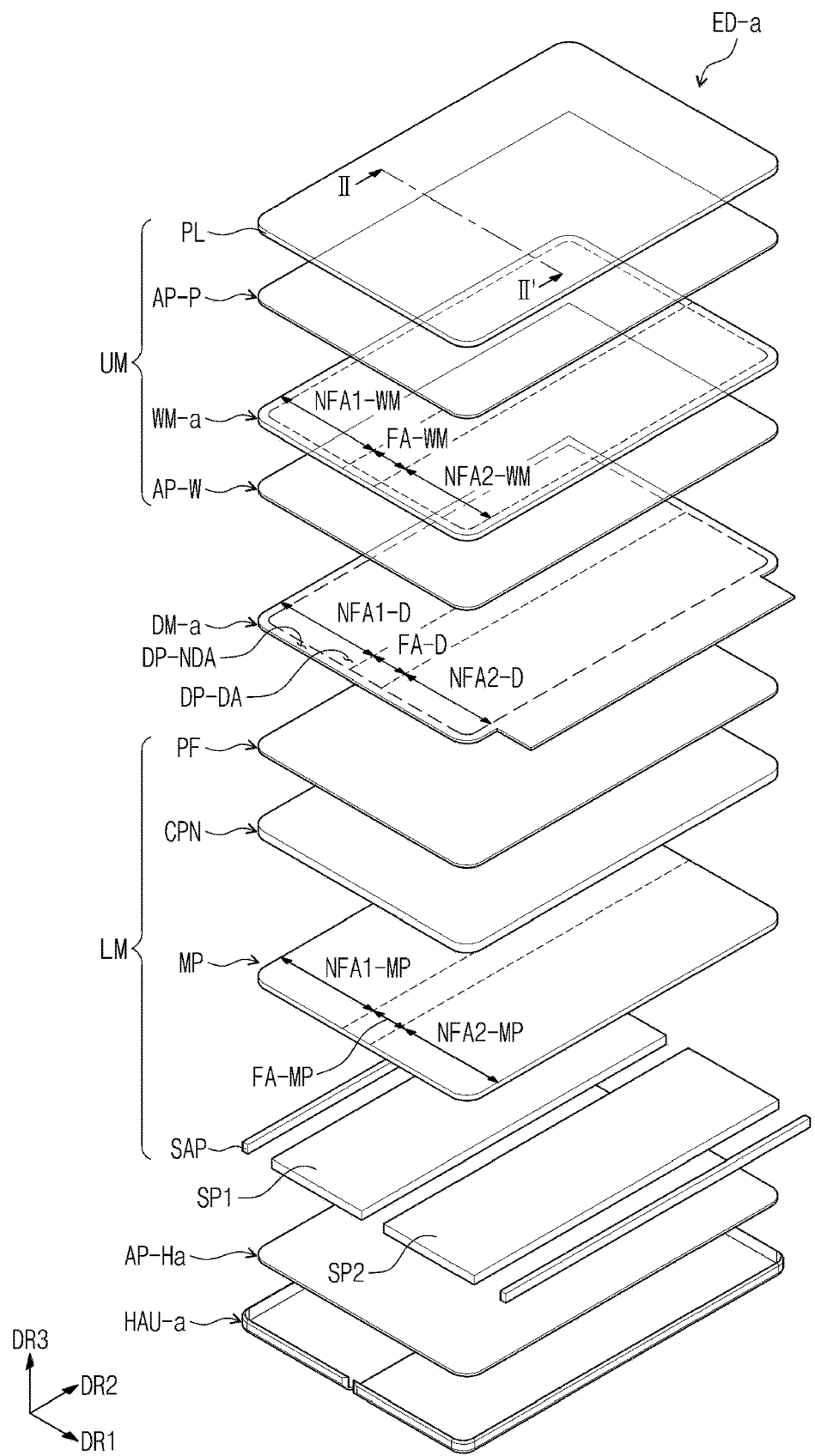
FIG. 4 is an exploded perspective view of a display device according to an embodiment.
Figure 5:
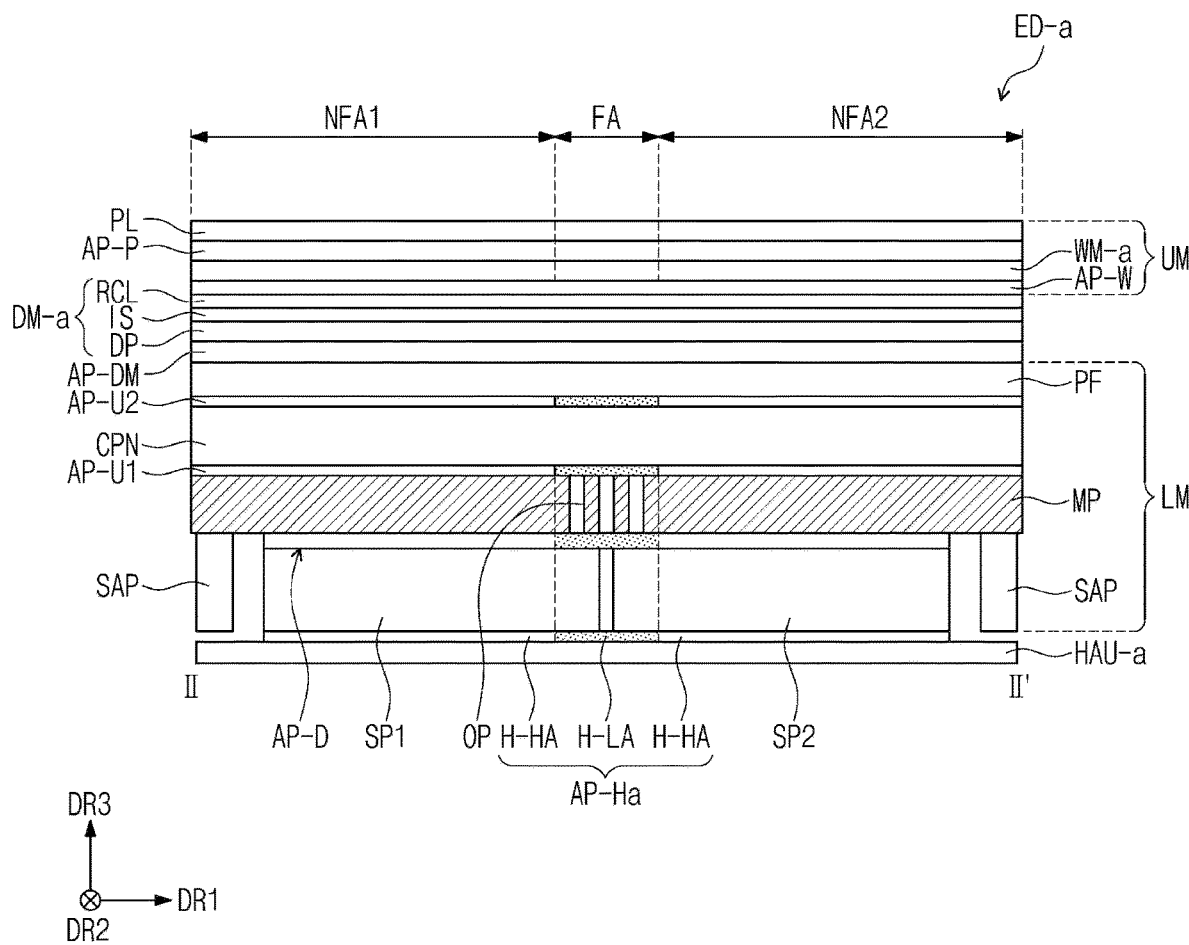
FIG. 5 is a cross-sectional view of a display device according to an embodiment.

FIG. 4 is an exploded perspective view of a display device according to an embodiment, and FIG. 5 is a cross-sectional view of a display device according to an embodiment. FIG. 4 shows an exploded perspective view of an example display device according to an embodiment, shown in FIG. 3A. FIG. 5 is a cross-sectional view showing a part corresponding to the line II-II' of FIG. 4.

Referring to FIG. 4 and FIG. 5, the display device ED-a of an embodiment may include a display module DM-a, an upper module UM disposed on the upper side of the display module DM-a, and a lower module LM disposed on the lower side of the display module DM-a. In the description, the upper module UM may be referred to as a protective member, and the lower module LM may be referred to as a support member.

The upper module UM may play the role of a protective part that is disposed on the upper side of the display module DM for protecting the display module DM from external impact, etc., and/or may play the role of an optical part preventing or reducing reflection of external light and/or increasing light extraction efficiency.

The upper module UM may include a window WM-a disposed on the upper side of the display module DM-a, a protective layer PL disposed on the upper side of the window WM-a, and a protective layer adhesive layer AP-P disposed between the window WM-a and the protective layer PL.

In some embodiments, the upper module UM may further include a window adhesive layer AP-W disposed on the lower side of the window WM-a. The window adhesive layer AP-W may be disposed between the display module DM-a and the window WM-a. The window adhesive layer AP-W may be an optically clear adhesive film (OCA), or an optically clear adhesive resin layer (OCR). In an embodiment, the window adhesive layer AP-W may not be provided.

The display device ED-a of an embodiment may include a housing HAU-a for containing the display module DM-a and the lower module LM. The housing HAU-a may be combined with the window WM-a. In some embodiments, the housing HAU-a may include a hinge structure for easy folding or bending. The hinge structure may be disposed corresponding to the folding area FA.

The display device ED-a of an embodiment may include a housing adhesive layer AP-Ha. The housing adhesive layer AP-Ha may play the role of immobilizing (e.g., securing) the lower module LM to the housing HAU-a. In some embodiments, the housing adhesive layer AP-Ha may include a folding adhesive part H-LA corresponding to the folding area FA and a non-folding adhesive part H-HA corresponding to the non-folding areas NFA1 and NFA2. In some embodiments, the housing adhesive layer AP-Ha is an adhesive member for combining the lower module LM and the housing HAU-a, and may play the role of an electromagnetic wave shielding layer and/or a heat dissipation layer.

In an embodiment, the window WM-a may include a window folding part FA-WM and window non-folding parts NFA1-WM and NFA2-WM. In the description, the window folding part FA-WM may be referred to as a folding part, and the window non-folding parts NFA1-WM and NFA2-WM may be referred to as non-folding parts. The first non-folding part NFA1-WM and the second non-folding part NFA2-WM of the window WM-a may be separated from each other with the folding part FA-WM therebetween. The folding part FA-WM may be a part corresponding to the folding area FA (FIG. 3A), and the non-folding parts NFA1-WM and NFA2-WM may be parts corresponding to the non-folding areas NFA1 and NFA2 (FIG. 3A).

As explained in the display device ED of an embodiment, referring to FIG. 1 and FIG. 2, the window WM-a includes an optically clear insulating material and may be a glass substrate or a polymer substrate. In some embodiments, the protective layer PL may include a polymer film as explained referring to FIG. 1 and FIG. 2.

In an embodiment, the protective layer PL may be disposed on the upper side of the window WM-a and may protect the window WM-a from external environments. Between the window WM-a and the protective layer PL, a protective layer adhesive layer AP-P may be disposed.

The protective layer adhesive layer AP-P may be an optically clear adhesive layer. The protective layer adhesive layer AP-P according to an embodiment may include a polymer compound including a polymer main chain and multiple crosslinking parts. In an embodiment, the protective layer adhesive layer AP-P may have reduced adhesive strength with the provision of (e.g., by exposing to) ultraviolet rays with a wavelength of about 280 nm or less. Accordingly, the protective layer PL may be easily removed from the display device ED-a according to the user's intension by reducing the adhesive strength of the protective layer adhesive layer AP-P utilizing ultraviolet rays. Accordingly, the display device ED-a of an embodiment includes the protective layer adhesive layer AP-P of which adhesive strength could be reduced through the provision of (e.g., by exposing to) ultraviolet rays with a wavelength of about 280 nm or less, and may show improved effects of reworkability.

In the display device ED-a of an embodiment, the display module DM-a may display images according to electrical signals and send/receive information on an external input. The display module DM-a may include a display area DP-DA and a non-display area DP-NDA. The display area DP-DA may be defined as an area for showing an image provided from the display module DM-a (e.g., defined as including (defined with) an area for shooting and/or showing a video provided from the display module DM-a).

The non-display area DP-NDA is adjacent to the display area DP-DA. For example, the non-display area DP-NDA may be around (e.g., surround) the display area DP-DA. However, this is only an example, and the non-display area DP-NDA may have one or more suitable shapes, without limitation to any one embodiment. According to an embodiment, the display area DP-DA of the display module DM-a may correspond to at least a portion of the active area F-AA (FIG. 3A).

In the display device ED-a according to an embodiment, the display module DM-a may include a folding display part FA-D and non-folding display parts NFA1-D and NFA2-D. The folding display part FA-D may be a part corresponding to the folding area FA (FIG. 3A), and the non-folding display parts NFA1-D and NFA2-D may be parts corresponding to the non-folding areas NFA1 and NFA2 (FIG. 3A).

The folding display part FA-D may correspond to a part folded or bent relative to (e.g., along) the folding axis FX (FIG. 3A). The display module DM-a includes a first non-folding display part NFA1-D and a second non-folding display part NFA2-D, and the first non-folding display part NFA1-D and the second non-folding display part NFA2-D may be separated from each other with the folding display part FA-D therebetween.

The display module DM-a may include a display panel DP, and an input sensor IS disposed on the display panel DP. The display panel DP may include a display element layer. For example, the display element layer may include an organic electroluminescence element, a quantum dot light emitting element, a liquid crystal element layer, and/or the like. However, an embodiment of the present disclosure is not limited thereto. In an embodiment, the display module DM may further include an optical layer RCL. The optical layer RCL may be disposed on the upper side of the input sensor IS. The optical layer RCL may play the role of reducing reflection by external light. For example, the optical layer RCL may include a polarization layer and/or a color filter layer, and/or a layer including a dye/pigment, etc. In an embodiment, the optical layer RCL may be disposed directly on the input sensor IS. However, an embodiment of the present disclosure is not limited thereto, and a separate adhesive member may be further disposed between the input sensor IS and the optical layer RCL.

In some embodiments, the display device ED-a of an embodiment may further include a module adhesive layer AP-DM disposed between the display module DM-a and the lower module LM. The module adhesive layer AP-DM may be an optically clear adhesive film (OCA) or an optically clear adhesive resin layer (OCR).

In the display device ED-a according to an embodiment, the lower module LM may include a support plate MP and adhesive layers AP-U1, AP-U2 and AP-D disposed on the upper side and lower side of the support plate MP. In some embodiments, the lower module LM may further include at least one from among support parts SP1 and SP2, a charge part SAP, a module protective layer PF, and a buffer layer CPN. For example, the display device ED-a according to an embodiment may include a support plate MP disposed on the lower side of the display module DM-a, a module protective layer PF and a buffer layer CPN, disposed between the support plate MP and the display module DM-a, and support parts SP1 and SP2 and a charge part SAP, disposed on the lower part of the support plate MP.

In an embodiment, the support plate MP may be disposed on the lower side of the display module DM-a. The support plate MP may include a folding support part FA-MP and non-folding support parts NFA1-MP and NFA2-MP. In some embodiments, in the description, the folding support part FA-MP may be referred to as a folding part, and the non-folding support parts NFA1-MP and NFA2-MP may be referred to as non-folding parts. The first non-folding part NFA1-MP and the second non-folding part NFA2-MP of the support plate MP may be separated from each other with the folding part FA-MP therebetween. The folding part FA-MP may be a part corresponding to the folding area FA, and the non-folding parts NFA1-MP and NFA2-MP may be parts corresponding to the non-folding areas NFA1 and NFA2.

In an embodiment, the support plate MP may include a metal material or a polymer material. For example, the support plate MP may be formed by including stainless steel, aluminum, or an alloy thereof. In some embodiments, differently, the support plate MP may be formed utilizing a carbon fiber reinforced plastic (CFRP), etc. However, an embodiment of the present disclosure is not limited thereto, and the support plate MP may include a nonmetal material, a plastic, a carbon fiber reinforced plastic, and/or glass.

In the support plate MP, multiple openings OP may be defined. The openings OP may be defined corresponding to the folding area FA.

Referring to FIG. 4 and FIG. 5, a module protective layer PF may be disposed between the display module DM-a and the support plate MP. The module protective layer PF may be disposed on the lower side of the display module DM-a to protect the rear surface of the display module DM-a. The module protective layer PF may be overlapped with the whole display module DM-a. The module protective layer PF may include a polymer material. For example, the module protective layer PF may be a polyimide film or a polyethylene terephthalate film. However, these are only examples, and the material of the module protective layer PF is not limited thereto.

The display device ED-a according to an embodiment may include support parts SP1 and SP2, and a charge part SAP. The support parts SP1 and SP2 may be parts overlapped with the most (e.g., main) area of the display module DM-a. The charge part SAP may be a part disposed on the outside of the support parts SP1 and SP2 and overlapped with the surrounding area of the display module DM-a.

The support parts SP1 and SP2 may include a first sub-support part SP1 and a second sub-support part SP2 separated from each other in a first direction axis DR1. The first sub-support part SP1 and the second sub-support part SP2 may be separated from each other at a part corresponding to the folding axis FX (FIG. 3A). Because the support parts SP1 and SP2 are separated from each other in the folding area FA and provided as the first sub-support part SP1 and the second sub-support part SP2, the folding or bending properties of the display device ED-a may be improved. In some embodiments, the lower module LM may further include a cushion layer stacked on the upper side or lower side of the support parts SP1 and SP2. The cushion layer may include sub-cushion layers separated from each other at a part corresponding to the folding axis FX (FIG. 3A). Between the support parts SP1 and SP2, and the cushion layer, a lower adhesive layer, in which the adhesive strength of a part corresponding to the folding are FA is smaller than the adhesive strength of parts corresponding to the non-folding areas NFA1 and NFA2, may be further disposed. The lower adhesive layer may include the polymer compound according to an embodiment, including a polymer main chain and multiple crosslinking parts.

The cushion layer may prevent or reduce the pressurizing phenomenon and deformation of the support plate MP by external impact and/or force. The cushion layer may include an elastomer such as a sponge, a foamed foam, and/or a urethane resin. In some embodiments, the cushion layer may be formed by including at least one from among an acrylic polymer, a urethane-based polymer, a silicone-based polymer, and an imide-based polymer. However, an embodiment of the present disclosure is not limited thereto. The cushion layer may be disposed on the lower side of the support plate MP or on the lower side of the lower support plate.

The charge part SAP may be disposed at the surrounding area of the support parts SP1 and SP2. The charge part SAP may be disposed between the support plate MP and the housing HAU-a. The charge part SAP may fill up the space between the support plate MP and the housing HAU-a, and immobilize the support plate MP.

Referring to FIG. 4 and FIG. 5, the display device ED-a of an embodiment may include a buffer layer CPN in the lower module LM. The buffer layer CPN may play the role of a thickness compensating layer compensating the thickness of the lower side of the display module DM-a, and/or a support layer supporting the display module DM-a. In some embodiments, different from the drawings, the buffer layer CPN may not be provided.

In the display device ED-a of an embodiment, the combination of the configurations included in the lower module LM is not limited to the configuration shown or explained in the description, and the combination may be suitably changed according to the size and/or shape of the display device ED-a, and/or the operation properties of the display device ED-a. For example, the lower module LM may further include an additional configuration such as a support plate, a cushion member, and/or an adhesive layer, or some of the configuration of the lower module LM shown in FIG. 4 and FIG. 5 may not be provided.

In the display device ED-a of an embodiment, the lower module LM may include at least one of upper adhesive layers AP-U1 and AP-U2 disposed on the upper side of the support plate MP, and at least one lower adhesive layer AP-D disposed on the lower side of the support plate MP.

At least one from among adhesive layers AP-U1, AP-U2 and AP-D, included in the lower module LM may include the polymer compound according to an embodiment, including multiple polymer main chains and multiple crosslinking parts. At least one from among the adhesive layers AP-U1, AP-U2 and AP-D, included in the lower module LM may have an adhesive strength at a part corresponding to the folding area FA smaller than an adhesive strength at a part corresponding to the non-folding areas NFA1 and NFA2. The adhesive layers AP-U1, AP-U2 and AP-D, including the polymer compound may include a part of which adhesive strength is reduced by the provision of (e.g., by exposing to) ultraviolet rays with a wavelength of about 280 nm or less to show reduced bending deformation during folding operations. In some embodiments, the adhesive strength of a part without being provided with (e.g., without being exposed to) ultraviolet rays with a wavelength of about 280 nm or less may be maintained, and the adhesive strength of adjacent members may be maintained by the adhesive layers AP-U1, AP-U2 and AP-D.

Figure 6:
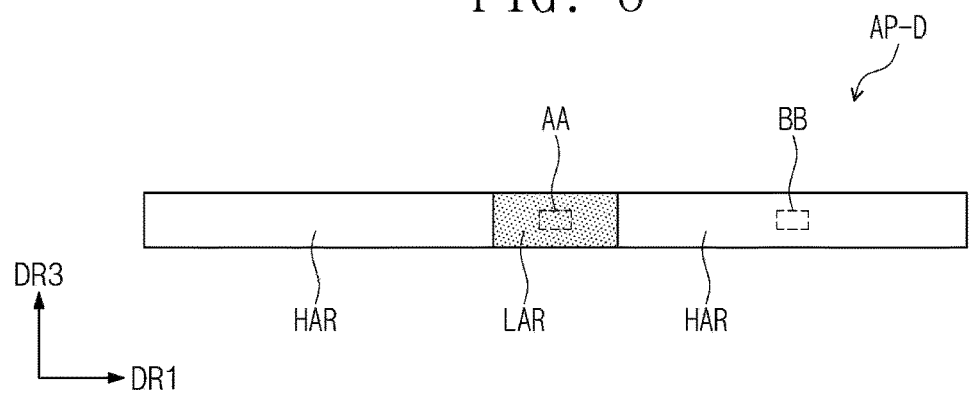
FIG. 6 is a cross-sectional view of a lower adhesive layer according to an embodiment.

FIG. 6 is a cross-sectional view showing an embodiment of an adhesive layer included in the display device according to an embodiment. In FIG. 6, an embodiment of a lower adhesive layer AP-D included in a lower module is shown, but the configuration of the adhesive layer shown in FIG. 6 may also be applied to the upper adhesive layers AP-U1 and AP-U2, and the housing adhesive layer AP-Ha in the display device ED-a shown in FIG. 5.

Referring to FIG. 5 and FIG. 6, the lower adhesive layer AP-D according to an embodiment may include a first adhesive part HAR corresponding to the non-folding areas NFA1 and NFA2 and having a first adhesive strength, and a second adhesive part LAR corresponding to the folding area FA and having a second adhesive strength smaller than the first adhesive strength.

The lower adhesive layer AP-D includes a polymer compound including multiple polymer main chains and multiple crosslinking parts, and the crosslinking parts may form multiple crosslinking bonds between the polymer main chains through Diels-Alder reaction. In addition, the crosslinking bonds formed by the crosslinking parts may be separated (e.g., broken) through Retro-Diels-Alder reaction. For example, the lower adhesive layer AP-D may include crosslinking parts capable of carrying out reversible crosslinking reaction through Diels-Alder reaction and Retro-Diels-Alder reaction.

The crosslinking parts included in the lower adhesive layer AP-D according to an embodiment may be a part carrying out Diels-Alder reaction and Retro-Diels-Alder reaction reversibly according to different wavelength regions of ultraviolet rays, respectively.

Figure 7:
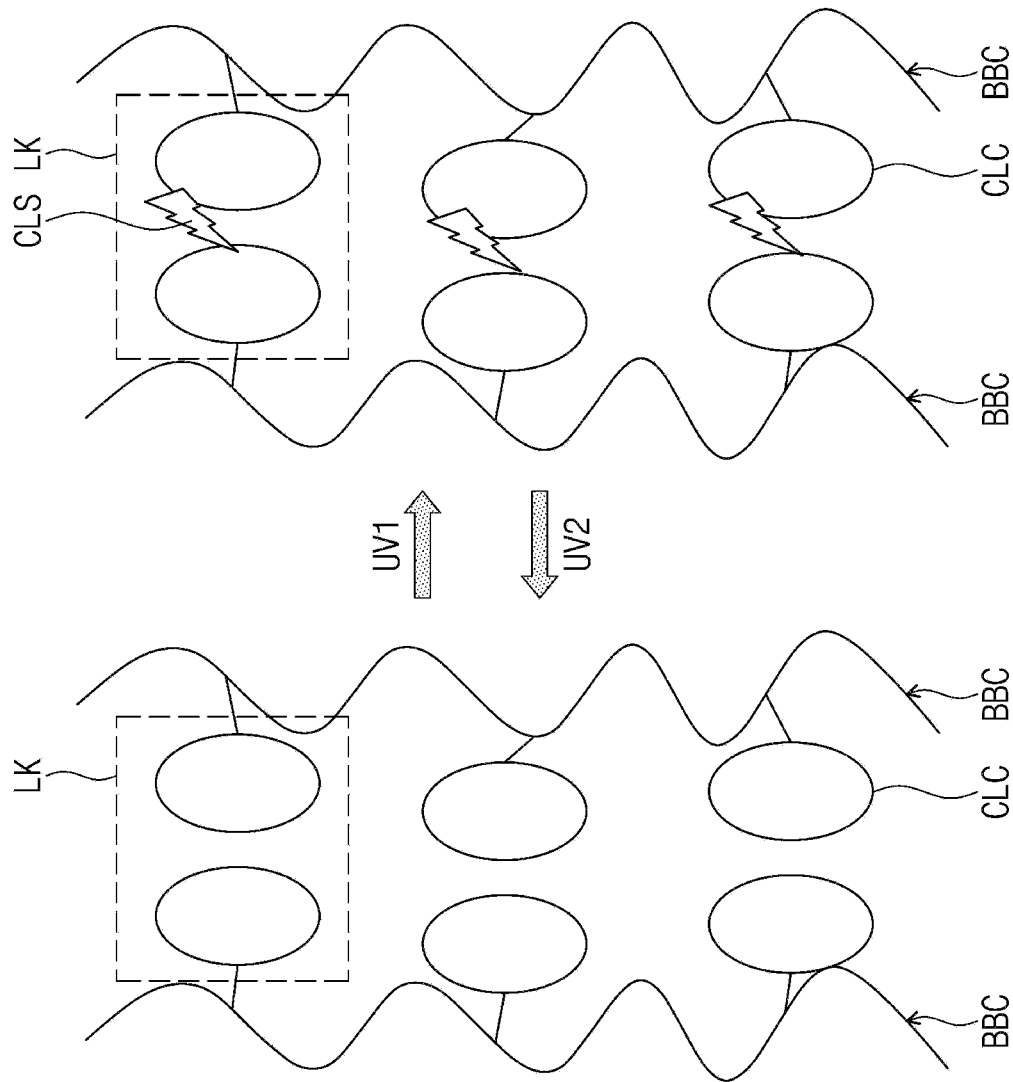
FIG. 7 schematically illustrates the crosslinking reaction in a polymer compound included in an adhesive layer according to an embodiment.

FIG. 7 shows an example of the mechanism of the crosslinking reaction in a polymer compound according to an embodiment, included in an adhesive layer according to an embodiment. Referring to FIG. 7, the polymer compound may include a polymer main chain BBC and multiple crosslinking parts CLC. One side of the crosslinking part CLC may be connected with the polymer main chain BBC.

The polymer main chain BBC may be formed by the polymerization reaction of an acrylate-based monomer. The polymerization reaction of the monomer may be performed by heat or ultraviolet rays. In an embodiment, the polymer main chain BBC may be formed by the polymerization reaction of at least one monomer from among a 4-hydroxybutyl acrylate (4-HBA) monomer, a butyl acrylate (BA) monomer, and a methyl methacrylate (MMA) monomer.

In the polymer compound, adjacent crosslinking parts CLC from among the multiple crosslinking parts CLC may be combined with each other by exposing to first ultraviolet rays UV1 to form a crosslinking bond part LK connecting between the polymer main chains BBC. The crosslinking bond part LK may include a crosslinking bond CLS formed by the bonding of adjacent crosslinking parts CLC. In some embodiments, the crosslinking bond CLS may be separated again (e.g., broken) by exposing to second ultraviolet rays UV2, and the crosslinking bond CLS may be separated so that the crosslinking bond part LK may change into crosslinking parts CLC separated from each other.

In an embodiment, the first ultraviolet rays UV1 may be light in a wavelength region of greater than about 280 nm, and the second ultraviolet rays UV2 may be light in a wavelength region of about 280 nm or less. For example, the first ultraviolet rays UV1 may be ultraviolet rays in a UVA or UVB region, and the second ultraviolet rays UV2 corresponds to ultraviolet rays in a UVC region. The first ultraviolet rays UV1 may be UVA light which is light in a wavelength region of about 315 nm to about 380 nm, or UVB light which is light in a wavelength region of greater than about 280 nm to about 315 nm. The second ultraviolet rays UV2 may be UVC light which is light in a wavelength region of about 100 nm to about 280 nm. For example, in an embodiment, the first ultraviolet rays UV1 may have a central wavelength of about 365 nm, and the second ultraviolet rays UV2 may have a central wavelength of about 280 nm. However, an embodiment of the present disclosure is not limited thereto.

After irradiating the first ultraviolet rays UV1, the adhesive strength of the adhesive layer including a polymer compound forming the crosslinking bond CLS may be increased when compared to the adhesive strength of the adhesive layer including the crosslinking part CLC prior to the irradiation of the first ultraviolet rays UV1. In addition, when the polymer compound forming the crosslinking bond CLS is changed into the polymer compound before crosslinking by irradiating the second ultraviolet rays UV2, the adhesive strength of the adhesive layer may be reduced when compared to the adhesive strength of the adhesive layer after irradiating the first ultraviolet rays UV1.

Referring to FIG. 6 and FIG. 7, the adhesive strength of the lower adhesive layer AP-D according to an embodiment may be controlled or selected according to the first ultraviolet rays UV1 and the second ultraviolet rays UV2 and may include parts having different adhesive strengths from each other. In an embodiment of the lower adhesive layer AP-D, a first adhesive part HAR may be a part including crosslinking bond parts LK formed by exposing to the first ultraviolet rays UV1, and a second adhesive part LAR may be a part including the crosslinking bond parts LK in a separated (e.g., broken) state by exposing to the second ultraviolet rays UV2. The polymer compound included in the first adhesive part HAR including the crosslinking bond parts LK may have higher strength than the polymer compound included in the second adhesive part LAR, and accordingly, the first adhesive part HAR may have relatively greater adhesive strength compared to the second adhesive part LAR. The second adhesive strength of the second adhesive part LAR may be about 10% or less of the first adhesive force of the first adhesive part HAR. For example, the second adhesive strength may be about 10 gf/inch, and the first adhesive strength may be about 400 gf/inch. However, an embodiment of the present disclosure is not limited thereto. In the disclosure, the adhesive strength of the adhesive layers may be shown as adhesive strength under 180° peel test conditions with a glass substrate as an adherent.

The second adhesive part LAR disposed corresponding to the folding area FA (FIG. 5) has low adhesive strength, and accordingly, the adhesive strength of the folding support part FA-MP (FIG. 4) and the lower adhesive layer AP-D, disposed corresponding to the folding area FA (FIG. 5) may be reduced. The adhesive strength in the folding area of the low module LM constituent elements combined as the lower adhesive layer AP-D may be reduced by the low adhesive strength, and accordingly, stress transferred during a folding operation to the lower adhesive layer AP-D, the support plate MP (FIG. 5), and other parts of the lower module LM (FIG. 5) may be reduced. Accordingly, the bending deformation in the display device during the folding operation may be reduced, and the display device according to an embodiment, including the lower adhesive layer AP-D with the reduced adhesive strength at a part corresponding to the folding area may show excellent or suitable folding reliability.

In some embodiments, the mechanism of crosslinking reaction in the polymer compound according to an embodiment, included in the adhesive layer according to an embodiment, shown in FIG. 7, may also be applied to the protective layer adhesive layer AP-P and the housing adhesive layer AP-H, included in the display device ED explained in FIG. 1 and FIG. 2. The protective layer adhesive layer AP-P and the housing adhesive layer AP-H may include a polymer compound including a polymer main chain and multiple crosslinking parts, and the crosslinking parts may form multiple crosslinking bonds between the polymer main chains through Diels-Alder reaction. In some embodiments, the crosslinking bonds formed by the crosslinking parts may be separated (e.g., broken) through Retro-Diels-Alder reaction. For example, the protective layer adhesive layer AP-P and the housing adhesive layer AP-H may include crosslinking parts carrying out reversible reaction through Diels-Alder reaction and Retro-Diels-Alder reaction. The protective layer adhesive layer AP-P and the housing adhesive layer AP-H may include crosslinking parts that may form crosslinking bonds by exposing to first ultraviolet rays in a wavelength region of greater than about 280 nm, and may separate the crosslinking bonds by exposing to second ultraviolet rays with a wavelength region of about 280 nm or less. By supplying the second ultraviolet rays to the whole or a partial region selected from the protective layer adhesive layer AP-P and the housing adhesive layer AP-H, the adhesive strength of the protective layer adhesive layer AP-P and the housing adhesive layer AP-H may be reduced. Compared to the first adhesive strength of the protective layer adhesive layer AP-P and the housing adhesive layer AP-H prior to irradiating the second ultraviolet rays, the second adhesive strength of the protective layer adhesive layer AP-P and the housing adhesive layer AP-H may be reduced after irradiating the second ultraviolet rays to about 10% of the first adhesive strength. In some embodiments, the same contents as the above-description may be applied for the protective layer adhesive layer AP-P included in the display device ED-a according to an embodiment, shown in FIG. 5.

Figure 8A:
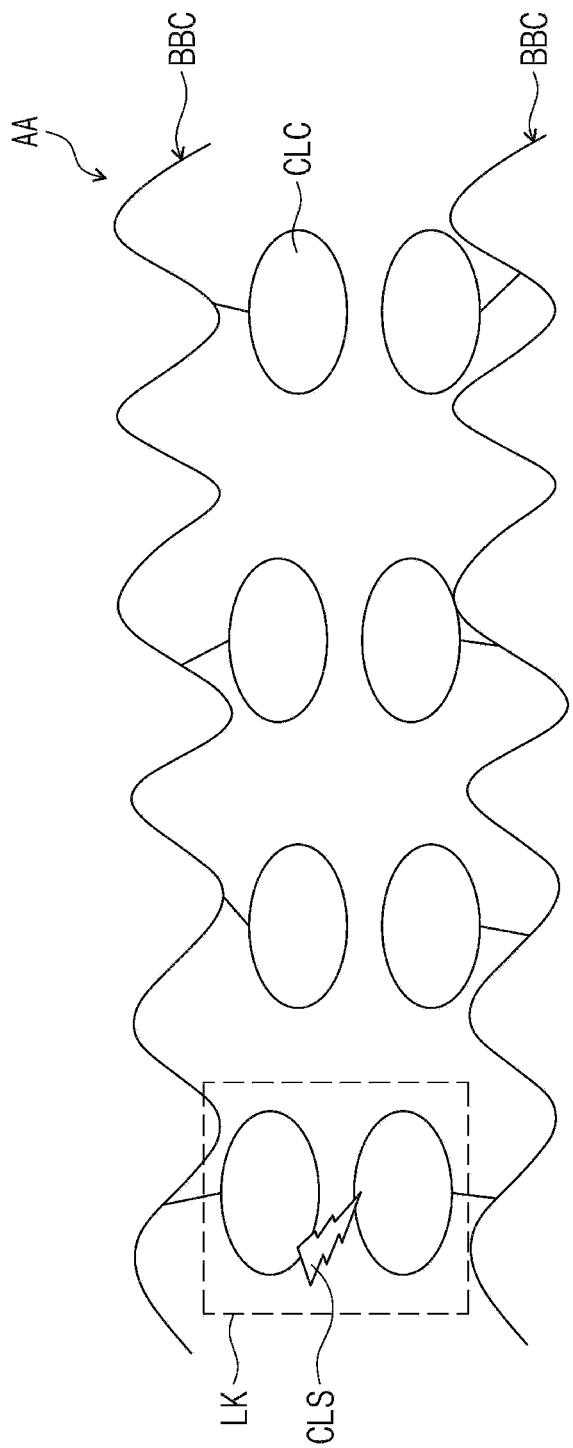
FIG. 8A is a diagram schematically showing a portion of an adhesive layer according to an embodiment.
Figure 8B:
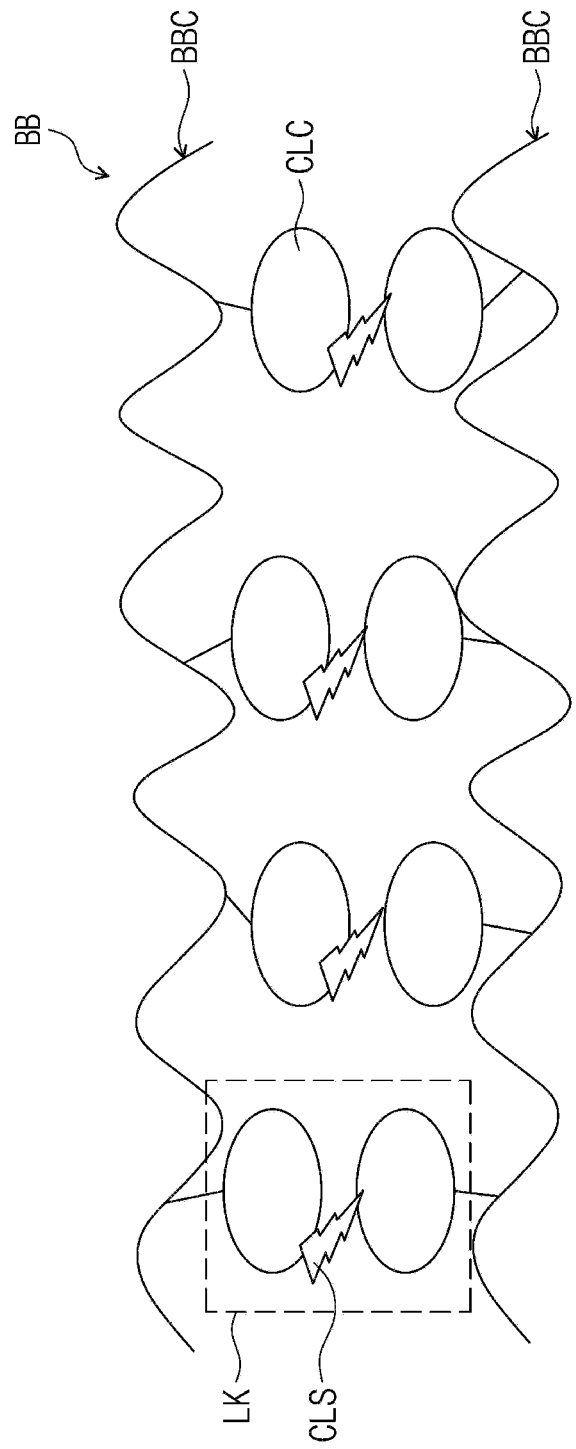
FIG. 8B is a diagram schematically showing a portion of an adhesive layer according to an embodiment.

FIG. 8A and FIG. 8B are diagrams schematically showing portions of adhesive layers according to an embodiment. FIG. 8A shows an area "AA" which is a part of the second adhesive part LAR of FIG. 6, and FIG. 8B shows an area "BB" which is a part of the first adhesive part HAR of FIG. 6. FIG. 8A and FIG. 8B show the second adhesive part LAR and the first adhesive part HAR with the same unit area for comparison.

Referring to FIG. 8A and FIG. 8B, the number of the crosslinking bonds CLS in the area "BB" which is a part of the first adhesive part having relatively higher adhesive strength in substantially the same unit area, may be greater than the number of the crosslinking bonds CLS in the area "AA" which is a part of the second adhesive part having relatively lower adhesive strength. In some embodiments, different from FIG. 8A, in an embodiment, the crosslinking bonds CLS are not included in the whole area of the second adhesive part, and the crosslinking parts CLC in the second adhesive part may be included in a separated state from each other (e.g., not bonded to each other).

In some embodiments, the same contents on the lower adhesive layer AP-D shown in FIG. 6 to FIG. 8B, etc., and explained, may be applied to the upper adhesive layers AP-U1 and AP-U2, and the housing adhesive layer AP-Ha in the display device ED-a according to an embodiment, shown in FIG. 5.

Referring to FIG. 5 to FIG. 8B, etc., at least one from among the upper adhesive layers AP-U1 and AP-U2 may include a polymer compound including multiple polymer main chains and multiple crosslinking parts, wherein the crosslinking parts may form multiple crosslinking bonds between the polymer main chains through Diels-Alder reaction, and the crosslinking bonds may be separated (e.g., broken) through Retro-Diels-Alder reaction. At least one from among the upper adhesive layers AP-U1 and AP-U2 may include a first adhesive part including a formation state of crosslinking bond parts LK (e.g., crosslinking bond parts LK in a bonded state) formed by exposing to first ultraviolet rays UV1, and a second adhesive part including a separated state of the crosslinking bond parts LK (e.g., crosslinking bond parts LK in an un-bonded state) separated by exposing to second ultraviolet rays UV2. The first adhesive part may have relatively greater adhesive strength when compared to the second adhesive part. The second adhesive strength of the second adhesive part may be about 10% or less of the first adhesive strength of the first adhesive part. The upper adhesive layers AP-U1 and AP-U2 include the second adhesive part of which adhesive strength has been easily controlled or selected and reduced by ultraviolet rays, and stress may be reduced during a folding operation to reduce bending deformation in the display device ED-a. Accordingly, the display device according to an embodiment, including the upper adhesive layers AP-U1 and AP-U2, of which adhesive strength at parts corresponding to the folding area is reduced, may show excellent or suitable folding reliability.

Referring to FIG. 5 to FIG. 8B, etc., the housing adhesive layer AP-Ha may include a polymer compound including multiple polymer main chains and multiple crosslinking parts, wherein the crosslinking parts may form multiple crosslinking bonds between the polymer main chains through Diels-Alder reaction, and the crosslinking bonds may be separated (e.g., broken) through Retro-Diels-Alder reaction. The housing adhesive layer AP-Ha may include a non-folding adhesive part H-HA including a formation state of the crosslinking bond parts LK (e.g., crosslinking bond parts LK in a bonded state) formed by exposing to first ultraviolet rays UV1, and a folding adhesive part H-LA including a separated state of the crosslinking bond parts LK (e.g., crosslinking bond parts LK in an un-bonded state) separated by exposing to second ultraviolet rays UV2. The non-folding adhesive part H-HA may have relatively greater adhesive force when compared to the folding adhesive part H-LA. The second adhesive strength of the folding adhesive part H-LA may be about 10% or less of the first adhesive strength of the non-folding adhesive part H-HA. The display device ED-a according to an embodiment includes a folding adhesive part H-LA of which adhesive strength has been easily controlled (selected) and reduced by ultraviolet rays, and the adhesive strength between the housing HAU-a and the lower module LM, combined by the housing adhesive layer AP-Ha in the folding area may be reduced. Accordingly, in the display device ED-a including the housing adhesive layer AP-Ha, according to an embodiment, stress transferred to the housing adhesive layer AP-Ha, the lower module LM, and the housing HAU-a may be reduced during a folding operation to reduce bending deformation in the display device. Therefore, the display device according to an embodiment, including the housing adhesive layer AP-Ha with reduced adhesive strength at a part corresponding to the folding area, may show excellent or suitable folding reliability.

In some embodiments, the crosslinking parts CLC included in the polymer compound according to an embodiment, included in the adhesive layer according to an embodiment explained referring to FIG. 7, etc., include a conjugated diene and a dienophile, and the conjugated diene and the dienophile may share a bond with each other (e.g., may form a bond with each other) and may form a hydrocarbon ring. For example, the crosslinking parts CLC according to an embodiment may form crosslinking bonds CLS in the polymer compound by forming a hydrocarbon ring by Diels-Alder reaction. In some embodiments, the dienophile may include an alkene moiety.

The hydrocarbon ring formed by the crosslinking parts CLC by Diels-Alder reaction may be a saturated hydrocarbon ring or an unsaturated hydrocarbon ring. In some embodiments, at least one from among the ring-forming carbon atoms of the hydrocarbon ring may be substituted with a heteroatom.

The conjugated diene and the dienophile may both be included in one molecule, or differently, may be included in different compounds (e.g., molecules), separately. In some embodiments, the crosslinking part CLC in one compound molecule may include both (e.g., simultaneously) the conjugated diene and the dienophile, or differently, in some embodiments, the polymer compound may include a mixture of a first compound molecule including the diene and a second compound molecule including the dienophile.

In an embodiment, the crosslinking part CLC may include an anthracene derivative represented by Formula 1. The anthracene derivative is part of one compound molecule and may function as the crosslinking part CLC.

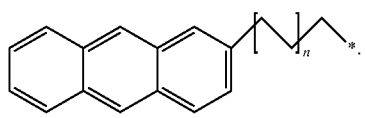

Formula 1

In Formula 1, "n" is an integer of 1 to 20, and -* is a part bonded to a polymer main chain BBC. For example, in Formula 1, "n" is an integer of 1 to 10, and for example, may be 6. However, an embodiment of the present disclosure is not limited thereto.

In some embodiments, at least one hydrogen atom in the hexagon rings of the anthracene derivative represented by Formula 1 may be substituted with a substituent. For example, at least one hydrogen atom may be substituted with a deuterium atom, a halogen atom, a cyano group, a nitro group, an amino group, a silyl group, an oxy group, a thio group, a sulfinyl group, a sulfonyl group, a carbonyl group, a boron group, a phosphine group, an alkyl group, an alkenyl group, an alkynyl group, a hydrocarbon ring group, or a heterocyclic group.

In some embodiments, in the crosslinking part CLC of the anthracene derivative represented by Formula 1, the bonding part of the diene at positions 9 and 10 as represented below may be bonded to the bonding part of the diene at positions 9 and 10 of the crosslinking part CLC of an adjacent anthracene derivative through cyclization reaction. For example, adjacent two crosslinking parts CLC of anthracene derivatives may be combined with each other to form a dimer.

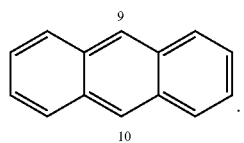

Adjacent two crosslinking parts from among the crosslinking parts represented by Formula 1 may be combined with each other by first ultraviolet rays with a wavelength of greater than about 280 nm to form a photodimer, and the photodimer thus formed may undergo photolysis by second ultraviolet rays with a wavelength of about 280 nm or less.

The photodimer formed by the combination of the crosslinking parts represented by Formula 1 may include a structure represented by Formula 2.

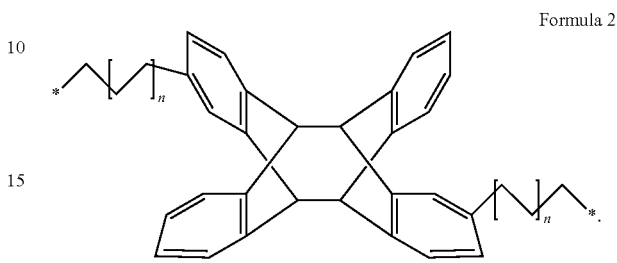

Formula 2

In Formula 2, "n" in Formula 1 is an integer of 1 to 20, and -* is a part bonded to the polymer main chain.

In some embodiments, the crosslinking part CLC may include a moiety represented by Formula D1 and a moiety represented by Formula D2. The moiety represented by Formula D1 including a conjugated diene and the moiety represented by Formula D2 including a dienophile may be combined with each other by Diels-Alder reaction by first ultraviolet rays UV1. In some embodiments, the moiety represented by Formula D1 and the moiety represented by Formula D2, combined with each other to form a ring, may be separated by Retro-Diels-Alder reaction by second ultraviolet rays UV2. The first ultraviolet rays UV1 may be light of UVA or UVB with a wavelength of greater than about 280 nm, and the second ultraviolet rays UV2 may be light of UVC with a wavelength of about 280 nm or less.

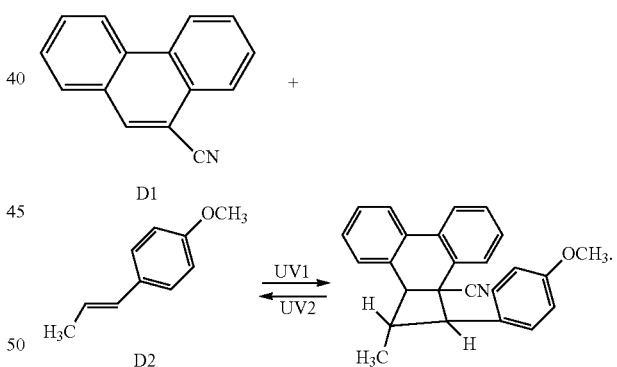

The adhesive strength of an adhesive layer including the crosslinking part CLC in a separated state of the moiety represented by Formula D1 and the moiety represented by Formula D2 (e.g., in a state where the moiety represented by Formula D1 and the moiety represented by Formula D2 are separated from and not reacted with each other) may be smaller than the adhesive strength of an adhesive layer including the crosslinking part CLC forming a hydrocarbon ring via the combination of the moiety represented by Formula D1 and the moiety represented by Formula D2 by Diels-Alder reaction.

In some embodiments, the moiety represented by Formula D1 and the moiety represented by Formula D2 correspond to examples of a conjugated diene moiety and a dienophile moiety carrying out reversible Diels-Alder reaction, respectively. The crosslinking part CLC included in the adhesive layer of an embodiment is not limited to the above-described compounds, and any compounds including a conjugated diene and a dienophile, having a reaction mechanism of forming crosslinking bonds through performing Diels-Alder reaction by exposing to first ultraviolet rays UV1 and separating the crosslinking bonds through performing Retro-Diels-Alder reaction by exposing to second ultraviolet rays UV2, may be utilized without limitation.

For example, in an embodiment, the adhesive layer may include compounds capable of performing reversible Diels-Alder reaction, as the crosslinking parts, as shown below. The crosslinking parts bonded to the polymer main chain may include a diene (including a diene part), and a dienophile including an alkene, concurrently (e.g., simultaneously), as shown below.

In the crosslinking parts, the types (kinds) of the moiety included as the diene are as follows.

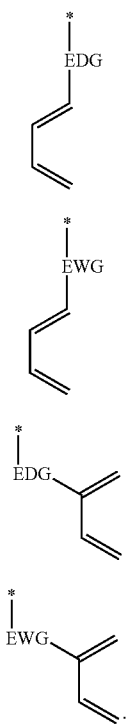

In the crosslinking parts, the types (kinds) of the moiety included as the dienophile are as follows.

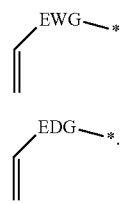

In Formulae D1-a, D1-c, and D2-b, "EDG" is an electron donating group, and in Formulae D1-b, D1-d, and D2-a, "EWG" corresponds to an electron withdrawing group. The types (kinds) of the electron donating group and the electron withdrawing group, utilized in Formulae D1-a to D1-d, D2-a and D2-b are not specifically limited, and suitable materials may be applied. In addition, in Formulae D1-a to D1-d, D2-a and D2-b, "-*" is a part bonded to the polymer main chain.

For example, in an embodiment, the crosslinking part CLC may include a diene selected from among D1-a to D1-d, and a dienophile selected from among D2-a and D2-b. In some embodiments, when the diene selected includes the electron donating group, the dienophile selected to utilize therewith may include an electron withdrawing group, and differently, when the diene selected includes an electron withdrawing group, the dienophile selected to utilize therewith may include an electron donating group.

The diene selected from among D1-a to D1-d, and the dienophile selected from among D2-a and D2-b may be combined with each other through Diels-Alder reaction by exposing to first ultraviolet rays UV1. In some embodiments, the diene and the dienophile combined with each other to form a ring, may be separated through Retro-Diels-Alder reaction by exposing to second ultraviolet rays UV2. The first ultraviolet rays UV1 may be light of UVA or UVB with a wavelength of greater than about 280 nm, and the second ultraviolet rays UV2 may be light of UVC with a wavelength of about 280 nm or less. For example, the Diels-Alder reaction and the Retro-Diels-Alder reaction may be performed as follows.

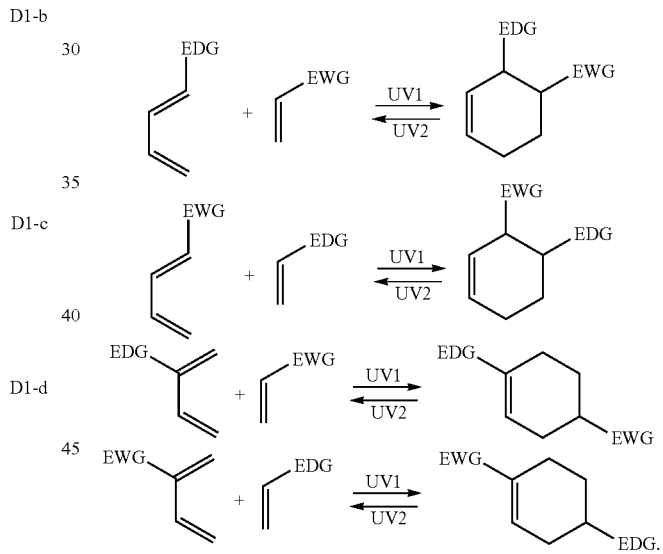

Figure 9:
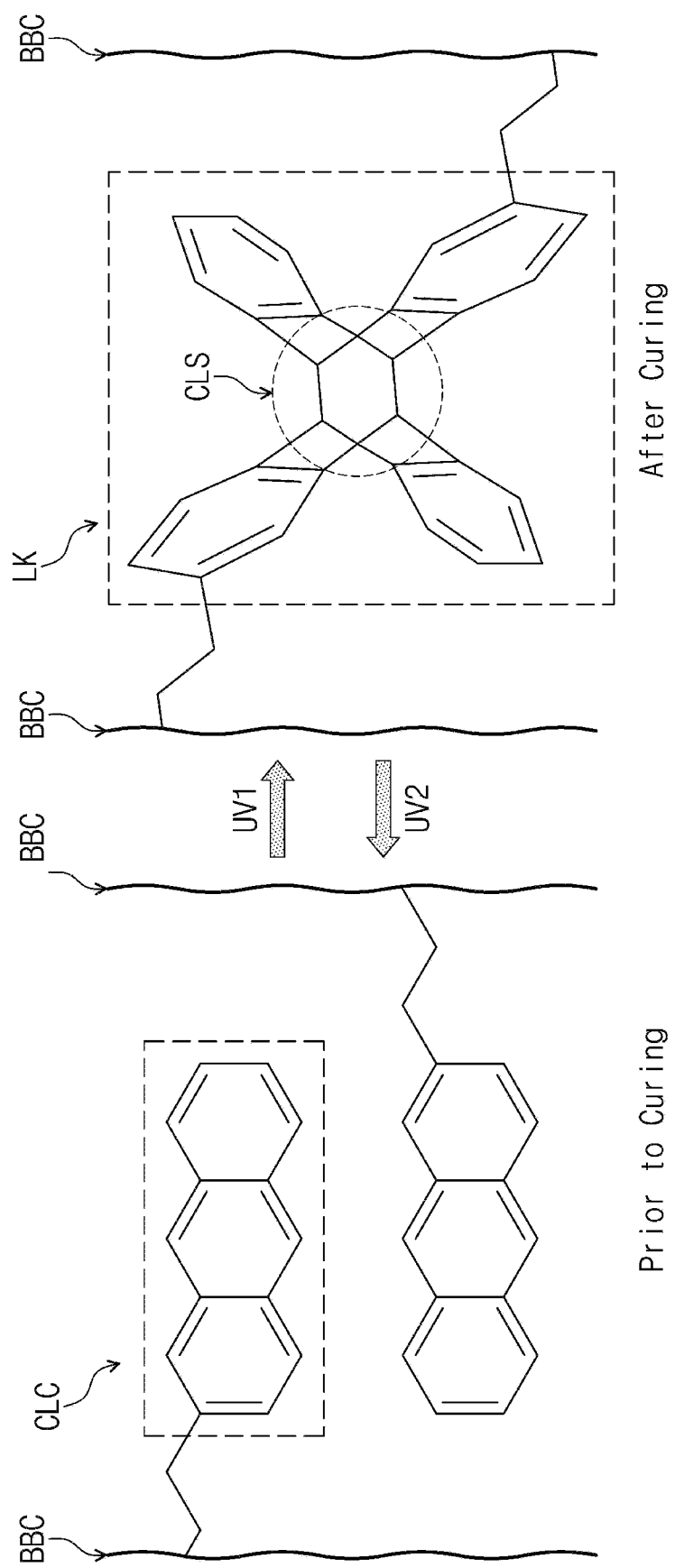
FIG. 9 is a diagram showing a polymer compound according to an embodiment.

In these reactions, each moiety may be bonded to a polymer main chain at the positions of EDG or EWG. FIG. 9 is a diagram showing a polymer compound according to an embodiment, included in at least one adhesive layer of the display device according to an embodiment. FIG. 9 shows a reaction mechanism for a case of including the crosslinking part represented by Formula 1. For example, in FIG. 9, a case where the crosslinking part CLC is an anthracene derivative is shown, but an embodiment of the present disclosure is not limited thereto.

Referring to FIG. 9, a polymer compound includes a polymer main chain BBC and multiple crosslinking parts CLC, and the multiple crosslinking parts CLC may be bonded to the polymer main chain BBC. The multiple crosslinking parts CLC may be bonded to the polymer main chain BBC as side chain types (kinds). In some embodiments, the case of a polymer compound including an anthracene derivative as a side chain, may be formed by the radical polymerization or condensation polymerization reaction of the moiety represented by Formula B1 or Formula B2.

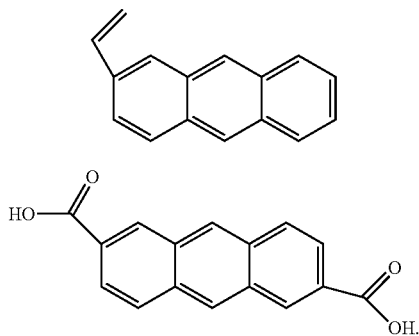

In FIG. 9, in the part represented as a state of "prior to curing", each of the crosslinking parts CLC is bonded to the polymer main chain BBC, and adjacent crosslinking parts CLC are not combined (e.g., not bonded) with each other but maintain a separated state. The state of "prior to curing" may be a state before irradiating first ultraviolet rays UV1, or a state after irradiating second ultraviolet rays UV2 (e.g., on a polymer compound that has been irradiated with the first ultraviolet rays UV1). In the state represented by "after curing", the crosslinking bond part LK may include a photodimer in a combination state by the crosslinking bond CLS. For example, in the state of "after curing", the crosslinking parts CLC may form the photodimer, and in the state of "prior to curing", the photodimer may undergo photolysis, and unbound crosslinking parts CLC may be included.

In an embodiment, a polymer compound including multiple polymer main chains and multiple crosslinking parts may be derived from a mixture of a monomer forming the polymer main chains, crosslinking parts generating crosslinking reaction, and an initiator. In an embodiment, the polymer compound may be formed by polymerizing a mixture including about 70-80 wt % of the monomer, about 5-20 wt % of the crosslinking part, and about 0.1-1 wt % of the initiator. The polymer compound includes about 5-20 wt % of the crosslinking part based on 100 wt % of the total weight of the polymer compound, to show excellent or suitable adhesive strength and durability. In some embodiments, the adhesive strength may be effectively controlled or selected utilizing UVC light.

For example, in the polymer compound, the polymer main chain may be an acrylate-based polymer formed by the polymerization reaction of at least one monomer from among a 4-hydroxybutyl acrylate (4-HBA) monomer, a butyl acrylate (BA) monomer, and a methyl methacrylate (MMA) monomer. The crosslinking parts may be the anthracene derivatives represented by Formula 1, and the initiator may be a photoinitiator of 1-hydroxycyclohexyl phenyl ketone. However, an embodiment of the present disclosure is not limited thereto.

In Table 1, physical properties of the adhesive layer corresponding to the state of "after curing" and the adhesive layer corresponding to the state of "prior to curing" in FIG. 9, are compared and shown. In Table 1, "after curing" corresponds to an adhesive layer after irradiating ultraviolet rays with a wavelength of about 365 nm, and "prior to curing" corresponds to an adhesive layer after irradiating ultraviolet rays with a wavelength of about 280 nm to the adhesive layer "after curing".

In Table 1, the transmittance is the transmittance of the adhesive layer in a visible region, the storage elasticity is a value at room temperature (e.g., 25° C.), and the adhesive strength corresponds to the adhesive strength of an adhesive layer with a glass substrate as an adherent (e.g., 25° C.).

TABLE 1

| Division | After curing | Prior to curing |
| --- | --- | --- |
| Transmittance (%) | 90 | ND |
| Storage elasticity (MPa) | 0.05 | ND |
| Adhesive strength (gf/inch) | 400 | 10 |

Referring to Table 1, the adhesive layer in the state of after curing showed a high transmittance of about 90%, and a high adhesive strength of about 400 gf/inch. Meanwhile, in the state of prior to curing after irradiating ultraviolet rays with a wavelength of about 280 nm, the measurement of the transmittance and storage elasticity was difficult (e.g., the values were too low), and the adhesive strength showed a low value of about 10 gf/inch. From the results of Table 1, it could be confirmed that the adhesive strength of the adhesive layer may be controlled or selected according to the provision of ultraviolet rays.

Figure 10A:
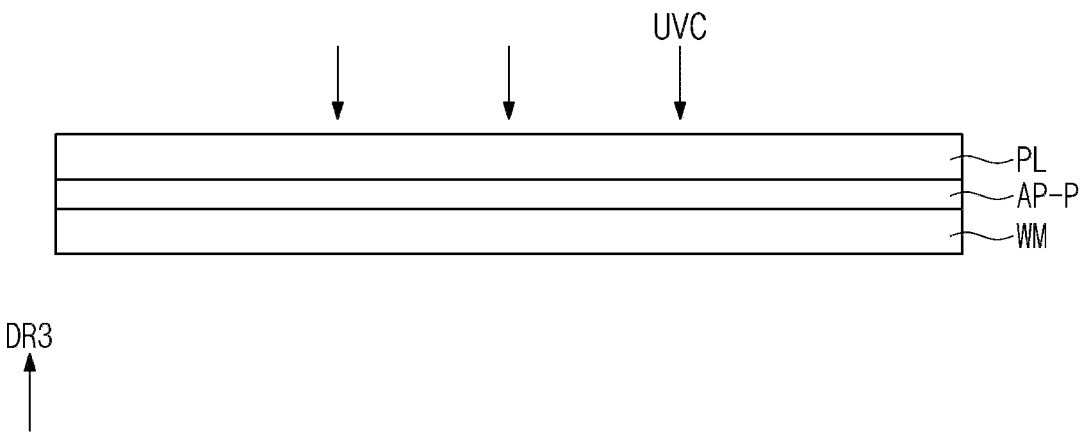
FIG. 10A is a diagram schematically illustrating g one step of a method of detaching a protective layer utilizing a protective layer adhesive layer.
Figure 10B:
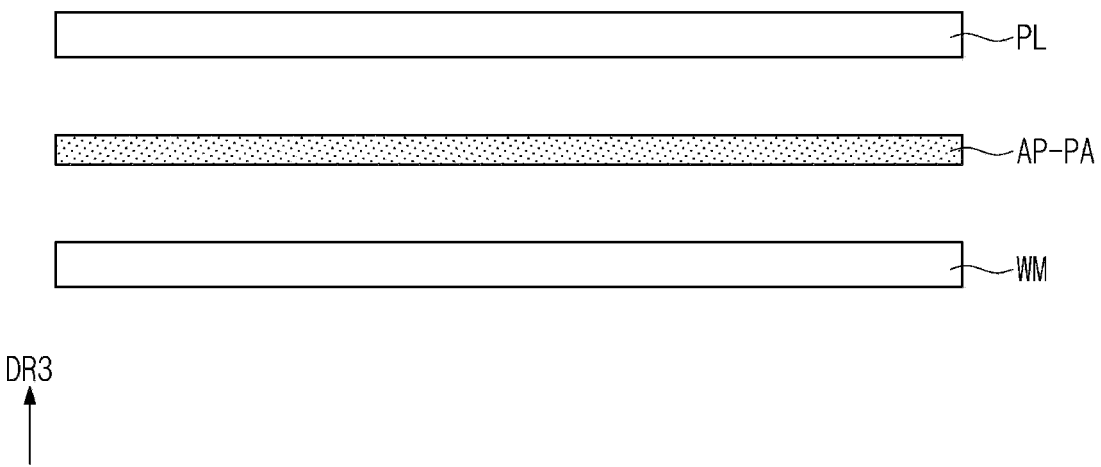
FIG. 10B is a diagram schematically illustrating one step of a method of detaching a protective layer utilizing a protective layer adhesive layer.

FIG. 10A and FIG. 10B are diagrams showing a detaching method of a protective layer by controlling the adhesive strength of a protective layer adhesive layer. FIG. 10A shows a part of a display device, and in FIG. 10A, a window WM, a protective layer adhesive layer AP-P, and a protective layer PL, stacked in order in a third direction axis DR3, are shown. In addition, in FIG. 10B, a separated state of the window WM and the protective layer PL, is shown.

The protective layer PL may be attached to the window WM by the protective layer adhesive layer AP-P. The protective layer adhesive layer AP-P in an attached state of the protective layer PL and the window WM, may correspond to the state of "after curing" shown in FIG. 9. Meanwhile, ultraviolet rays of UVC light may be irradiated from the protective layer PL side or the window WM side, and accordingly, the protective layer adhesive layer AP-P may change the state into the detached adhesive layer AP-PA, corresponding to the state of "prior to curing" shown in FIG. 9. For example, the window WM and the protective layer PL immobilized (e.g., attached together) by the protective layer adhesive layer AP-P may be easily separated by reducing the adhesive strength of the protective layer adhesive layer AP-P by the UVC light source. Accordingly, by controlling the adhesive strength of the protective layer adhesive layer AP-P utilizing ultraviolet light, the separation of the protective layer PL and the rework process including the addition of a new protective layer, may be easily performed, according to the need of a user or the requirement during the manufacturing process of a display device.

In some embodiments, the same configuration of the adhesive layer capable of such rework may be applied to the housing adhesive layers AP-H and AP-Ha shown in FIG. 2 or FIG. 4. For example, by controlling the adhesive strength of the housing adhesive layers AP-H and AP-Ha utilizing ultraviolet rays in an embodiment, between the housing HAU and the display module DM, or between the housing HAU-a and the lower module LM, the housing HAU and the display module DM, or the housing HAU-a and the lower module LM may be separated, and reworking process may be easily performed, as necessary, during the manufacturing process of the display device.

Figure 11A:
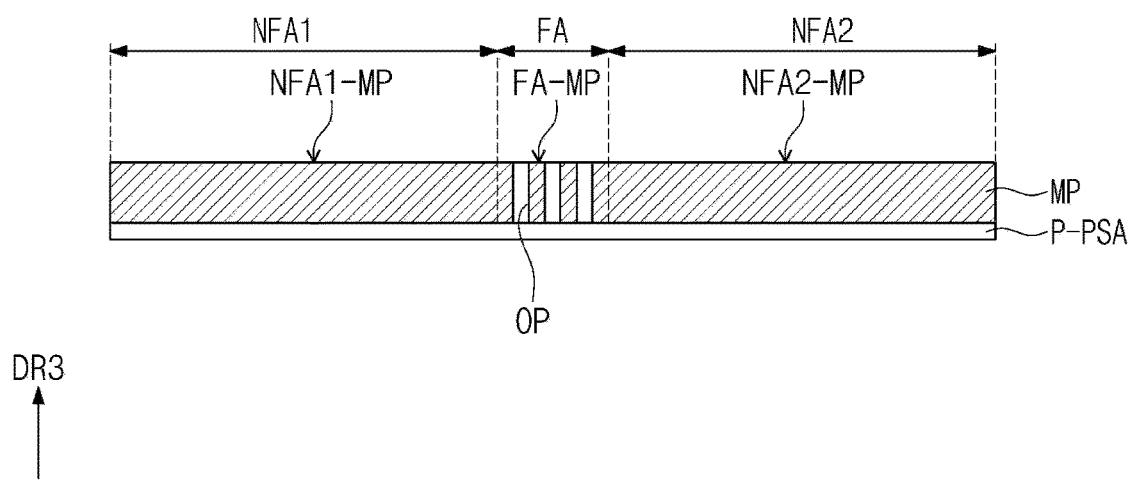
FIG. 11A is a diagram schematically illustrating one step of a method of manufacturing an adhesive layer according to an embodiment.
Figure 11B:
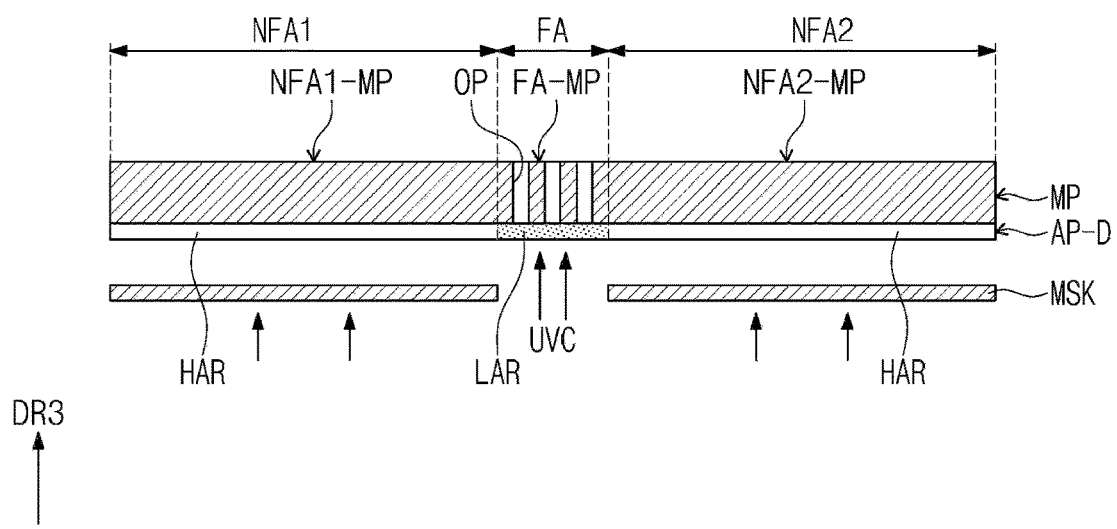
FIG. 11B is a diagram schematically illustrating one step of a method of manufacturing an adhesive layer according to an embodiment.

FIG. 11A and FIG. 11B are diagrams showing one step of a manufacturing method of an adhesive layer according to an embodiment. FIG. 11A and FIG. 11B are diagrams showing one step of a manufacturing method of a lower adhesive layer in which the adhesive strength of a selected area is reduced.

FIG. 11A illustrates a support plate MP including non-folding support parts NFA1-MP and NFA2-MP, and a folding support part FA-MP, and a preliminary adhesive layer P-PSA disposed on the lower side of the support plate MP in an attached state. In the preliminary adhesive layer P-PSA, the adhesive strength was shown in substantially uniform levels for a part corresponding to the folding support part FA-MP and the parts corresponding to the non-folding support parts NFA1-MP and NFA2-MP, overall.

FIG. 11B shows the manufacturing step of a lower adhesive layer AP-D in which the adhesive strengths of a first adhesive part HAR and a second adhesive part LAR are controlled or selected differently by irradiating UVC light only to a part corresponding to the folding area FA. In the preliminary adhesive layer P-PSA, by irradiating the UVC light only to a selected area utilizing a mask MSK, the adhesive strength in the area exposed to the UVC light may be reduced. Accordingly, the second adhesive part LAR may have lower adhesive strength than the first adhesive part HAR. For example, the second adhesive strength of the second adhesive part LAR may be reduced to about 10% or less of the first adhesive strength of the first adhesive part HAR. The adhesive strength of the second adhesive part LAR disposed corresponding to the folding support part FA-MP may be locally reduced, and the bending deformation of the folding support part FA-MP and the lower adhesive layer AP-D may be reduced.

In some embodiments, different from the method shown in FIG. 11A and FIG. 11B, a display device may be manufactured by the acts (e.g., steps) of manufacturing a lower adhesive layer AP-D first, of which adhesive strength in a selected area is reduced by utilizing a mask in (e.g., by irradiating UVC light through a mask on) the preliminary adhesive layer P-PSA not attached to the support plate MP, and then, attaching the lower adhesive layer AP-D manufactured to the support plate MP. In this case, the lower adhesive layer AP-D may be provided to the support plate MP so that the second adhesive part LAR having relatively lower adhesive strength is attached to the folding support part FA-MP, and the first adhesive part HAR having greater adhesive strength than the second adhesive part LAR is attached to the non-folding support parts NFA1-MP and NFA2-MP.

In FIG. 11A and FIG. 11B, a method of controlling the adhesive strength of the lower adhesive layer AP-D is shown as an embodiment, but such a controlling method of the adhesive strength may also be applied to the configuration of other adhesive layers which require the local control of adhesive strength. For example, in the display device ED-a according to an embodiment, shown in FIG. 5, the manufacturing method shown in FIG. 11A and FIG. 11B may be utilized for the manufacture of the upper adhesive layers AP-U1 and AP-U2, and the housing adhesive layer AP-Ha.

The display device of an embodiment includes a protective layer adhesive layer including crosslinking parts which form multiple crosslinking bonds between polymer main chains through Diels-Alder reaction, and the crosslinking bonds thus formed may be separated (e.g., broken) through Retro-Diels-Alder reaction, and a protective layer attached by the protective layer adhesive layer, and by easily controlling the adhesive strength of the protective layer adhesive layer through Diels-Alder reaction/Retro-Diels-Alder reaction utilizing ultraviolet rays, improved reworkability of the protective layer may be obtained.

The display device of an embodiment includes a folding area, and an adhesive layer corresponding to the folding area, of which adhesive strength is reduced, and the bending deformation of display device members in the folding area may be reduced to show excellent or suitable folding reliability. In some embodiments, by providing the adhesive layer of which adhesive strength at a part corresponding to the folding area is reduced, by utilizing Diels-Alder reaction/Retro-Diels-Alder reaction utilizing ultraviolet rays, the manufacture of a display device with improved folding properties of a flexible display device may become possible without an additional process for reducing adhesive strength partially, including the introduction of an adhesive strength reducing layer, or the removal of an adhesive layer in a folding area, thereby improving the manufacturing process efficiency of the display device.

The display device of an embodiment includes an adhesive layer in which crosslinking reaction is reversibly performed according to the wavelength region of ultraviolet rays, so as to easily reduce the adhesive strength at a portion requiring reworking to improve reworking efficiency.

In some embodiments, in the display device of an embodiment, adhesive strength at a part corresponding to a folding area is reduced to less than the adhesive strength at a part corresponding to a non-folding area, and flexible deformation of the configurations of the display device during folding is reduced to show excellent or suitable folding reliability.

Throughout the disclosure, the expression "at least one of a, b or c", "at least one selected from a, b, and c", "at least one selected from the group consisting of a, b, and c", "at least one from among a, b, and c", etc., indicates only a, only b, only c, both (e.g., simultaneously) a and b, both (e.g., simultaneously) a and c, both (e.g., simultaneously) b and c, all of a, b, and c, or variations thereof.

The use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The display device, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

Although the embodiments of the present disclosure have been described, it is understood that the present disclosure should not be limited to these embodiments, but one or more suitable changes and modifications can be made by one ordinary skilled in the art within the spirit and scope of the present disclosure as hereinafter claimed, and equivalents thereof.

What is claimed is:

1. A display device comprising:
   a display module;
   a window above the display module;
   a protective layer above the window;
   a housing under the display module; and
   a protective layer adhesive layer between the window and the protective layer,
   wherein the protective layer adhesive layer comprises a polymer compound comprising multiple polymer main chains and multiple crosslinking parts,
   wherein the polymer main chain is formed by a polymerization reaction of at least one monomer from among a 4-hydroxybutyl acrylate monomer, a butyl acrylate monomer, and a methyl methacrylate monomer,
   wherein each of the multiple crosslinking parts comprises an anthracene derivative represented by Formula 1:

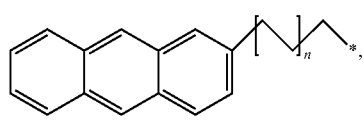

Formula 1 wherein in Formula 1, "n" is an integer of 1 to 20, and -* is a part bonded to the polymer main chain,
   wherein the multiple crosslinking parts form multiple crosslinking bonds between the multiple polymer main chains through Diels-Alder reaction, and
   wherein the multiple crosslinking bonds are to be separated through Retro-Diels-Alder reaction.

2. The display device of claim 1, wherein the multiple crosslinking bonds are assembled by exposing the multiple crosslinking parts to first ultraviolet rays with a wavelength of greater than about 280 nm, and the multiple crosslinking bonds are to be separated by exposing the multiple crosslinking bonds to second ultraviolet rays with a wavelength of about 280 nm or less.

3. The display device of claim 2, further comprising a housing adhesive layer between the display module and the housing, and the housing adhesive layer comprises the polymer compound.

4. The display device of claim 2, wherein a first adhesive strength of the protective layer adhesive layer with a glass substrate as an adherent in a state after being exposed to the second ultraviolet rays is about 10% or less of a second adhesive strength of the protective layer adhesive layer with the glass substrate as the adherent in a state after being exposed to only the first ultraviolet rays.

5. The display device of claim 1, wherein adjacent two crosslinking parts from among the multiple crosslinking parts are combined with each other by exposing to first ultraviolet rays with a wavelength of greater than about 280 nm to form a photodimer, and the photodimer is to undergo photolysis by exposing to second ultraviolet rays with a wavelength of about 280 nm or less.

6. The display device of claim 5, wherein the photodimer comprises a structure represented by Formula 2:

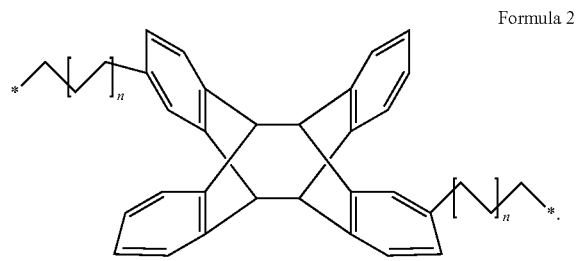

Formula 2 wherein in Formula 2, "n" is the same as defined in Formula 1, and
   -* is a part bonded to the polymer main chain.

7. The display device of claim 1, wherein
   the display device comprises a folding area and a non-folding area adjacent to the folding area, and further comprises a support plate between the display module and the housing, the support plate comprising a folding support corresponding to the folding area and a non-folding support corresponding to the non-folding area.

8. The display device of claim 7, further comprising a housing adhesive layer comprising a non-folding adhesive part corresponding to the non-folding area and having a first adhesive strength with a glass substrate as an adherent, and a folding adhesive part corresponding to the folding area and having a second adhesive strength with the glass substrate as the adherent, the second adhesive strength being smaller than the first adhesive strength,
   the housing adhesive layer comprises the polymer compound, and
   a number of the crosslinking bonds in the non-folding adhesive part is greater than a number of the crosslinking bonds in the folding adhesive part.

9. The display device of claim 7, further comprising at least one upper adhesive layer above the support plate, and at least one lower adhesive layer under the support plate, and
wherein at least one from among the at least one upper adhesive layer and the at least one lower adhesive layer comprises the polymer compound.

10. The display device of claim 9, wherein the at least one upper adhesive layer comprises a first adhesive part corresponding to the non-folding area and having a first adhesive strength with a glass substrate as an adherent, and a second adhesive part corresponding to the folding area and having a second adhesive strength with the glass substrate as the adherent, the second adhesive strength being smaller than the first adhesive strength,
the at least one upper adhesive layer comprises the polymer compound, and
a number of the crosslinking bonds in the first adhesive part is greater than a number of the crosslinking bonds in the second adhesive part.

11. The display device of claim 10, wherein the second adhesive strength is about 10% or less of the first adhesive strength.

12. The display device of claim 9, wherein the at least one lower adhesive layer comprises a first adhesive part corresponding to the non-folding area and having a first adhesive strength with a glass substrate as an adherent, and a second adhesive part corresponding to the folding area and having a second adhesive strength with the glass substrate as the adherent, the second adhesive strength being smaller than the first adhesive strength,
the at least one lower adhesive layer comprises the polymer compound, and
a number of the crosslinking bonds in the first adhesive part is greater than a number of the crosslinking bonds in the second adhesive part.

13. The display device of claim 12, wherein the second adhesive strength is about 10% or less of the first adhesive strength.

14. The display device of claim 1, wherein the protective layer comprises at least one polymer resin from among polyethylene terephthalate, polybutylene terephthalate, polyethylene naphthalene, polycarbonate, polymethyl methacrylate, polystyrene, polyvinyl chloride, polyethersulfone, polypropylene, polyamide, polyphenylene ether, polyoxymethylene, polysulfone, polyphenylene sulfide, polyimide, polyethyleneimine, polyether ether ketone, polyamide imide, polyarylate, and thermoplastic polyurethane.

15. The display device of claim 1, wherein the display device is a cellular phone, a tablet, a car navigation, a game console, or a wearable device.

16. A display device comprising a folding area foldable relative to a folding axis extended in a first direction, and a non-folding area adjacent to the folding area, the display device comprising:
a display module;
an upper module above the display module and comprising a window, a protective layer on the window, and a protective layer adhesive layer between the window and the protective layer; and
a lower module under the display module and comprising a support plate, an upper adhesive layer above the support plate, and a lower adhesive layer under the support plate,
wherein
at least one from among the upper adhesive layer and the lower adhesive layer comprises a polymer compound comprising multiple polymer main chains and multiple crosslinking parts,
the multiple crosslinking parts form multiple crosslinking bonds between the multiple polymer main chains through Diels-Alder reaction, and
the multiple crosslinking bonds are to be separated by Retro-Diels-Alder reaction, and
wherein the at least one from among the upper adhesive layer and the lower adhesive layer comprises a first adhesive part corresponding to the non-folding area and having a first adhesive strength with a glass substrate as an adherent and a second adhesive part corresponding to the folding area and having a second adhesive strength with the glass substrate as the adherent, the second adhesive strength being smaller than the first adhesive strength.

17. The display device of claim 16, wherein the multiple crosslinking bonds are assembled by exposing the multiple crosslinking parts to first ultraviolet rays with a wavelength of greater than about 280 nm, and the multiple crosslinking bonds are to be separated by exposing the multiple crosslinking bonds to second ultraviolet rays with a wavelength of about 280 nm or less.

18. The display device of claim 16, wherein
a number of the crosslinking bonds in the first adhesive part is greater than a number of the crosslinking bonds in the second adhesive part.

19. The display device of claim 18, wherein the second adhesive strength is about 10% or less of the first adhesive strength.

20. A display device comprising a folding area foldable relative to a folding axis extended in a first direction, and a non-folding area adjacent to the folding area, the display device comprising:
a display module;
an upper module above the display module and comprising a window, a protective layer on the window, and a protective layer adhesive layer between the window and the protective layer; and
a lower module under the display module and comprising a support plate, an upper adhesive layer above the support plate, and a lower adhesive layer under the support plate,
wherein
at least one from among the upper adhesive layer and the lower adhesive layer comprises a polymer compound comprising multiple polymer main chains and multiple crosslinking parts,
adjacent two crosslinking parts from among the multiple crosslinking parts are combined with each other by exposing to first ultraviolet rays with a wavelength of greater than about 280 nm to form a photodimer, and the photodimer is to undergo photolysis by second ultraviolet rays with a wavelength of about 280 nm or less, and
wherein the at least one from among the upper adhesive layer and the lower adhesive layer comprises a first adhesive part corresponding to the non-folding area and having a first adhesive strength with a glass substrate as an adherent, and a second adhesive part corresponding to the folding area and having a second adhesive strength with the glass substrate as the adherent, the second adhesive strength being smaller than the first adhesive strength.

21. The display device of claim 20, wherein each of the crosslinking parts comprises an anthracene derivative represented by Formula 1:

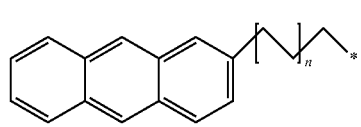

Formula 1 wherein in Formula 1, "n" is an integer of 1 to 20, and -* is a part bonded to the polymer main chain.

22. The display device of claim 21, wherein the photo-dimer comprises a structure represented by Formula 2:

Formula 2

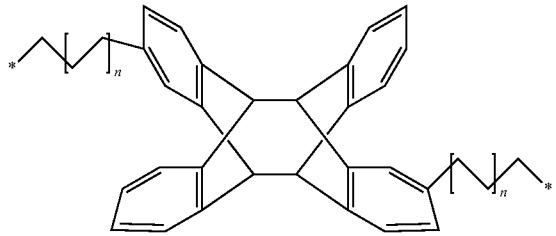

wherein in Formula 2, "n" is the same as defined in Formula 1, and
-* is a part bonded to the polymer main chain.

23. The display device of claim 20, wherein the polymer main chain is formed by a polymerization reaction of at least one monomer from among a 4-hydroxybutyl acrylate monomer, a butyl acrylate monomer, and a methyl methacrylate monomer.

24. The display device of claim 20, wherein
a number of crosslinking bonds between adjacent crosslinking parts of the multiple crosslinking parts in the first adhesive part is greater than a number of crosslinking bonds between adjacent crosslinking parts of the multiple crosslinking parts in the second adhesive part.

25. The display device of claim 24, wherein the second adhesive strength is about 10% or less of the first adhesive strength.

* * * * *